(12) United States Patent
Gu et al.

(10) Patent No.: US 11,795,074 B2
(45) Date of Patent: Oct. 24, 2023

(54) HALF-CELL ELECTROCHEMICAL CONFIGURATIONS FOR SELF-CLEANING ELECTROCHLORINATION DEVICES

(71) Applicant: EVOQUA WATER TECHNOLOGIES LLC, Pittsburgh, PA (US)

(72) Inventors: George Y. Gu, Andover, MA (US); Simon Paul Dukes, Chelmsford, MA (US); Joshua Griffis, Asburnham, MA (US); Michael J. Shaw, Derry, NH (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 654 days.

(21) Appl. No.: 16/491,728

(22) PCT Filed: Mar. 6, 2018

(86) PCT No.: PCT/US2018/021088
§ 371 (c)(1),
(2) Date: Sep. 6, 2019

(87) PCT Pub. No.: WO2018/165118
PCT Pub. Date: Sep. 13, 2018

(65) Prior Publication Data
US 2021/0130966 A1 May 6, 2021

Related U.S. Application Data

(60) Provisional application No. 62/469,224, filed on Mar. 9, 2017, provisional application No. 62/468,544, filed
(Continued)

(51) Int. Cl.
*C02F 1/46* (2023.01)
*C02F 1/467* (2023.01)
(Continued)

(52) U.S. Cl.
CPC ........ *C02F 1/4674* (2013.01); *C02F 1/46104* (2013.01); *C02F 2103/08* (2013.01);
(Continued)

(58) Field of Classification Search
CPC ......... C25B 9/23; C25B 1/26; C02F 2103/08; C02F 1/46
See application file for complete search history.

(56) References Cited

U.S. PATENT DOCUMENTS 4,101,394 A  7/1978 Johnson
5,288,373 A  2/1994 Yang
(Continued)

FOREIGN PATENT DOCUMENTS

JP  2002219464 A  8/2002
KR  20050081865 A  8/2005
(Continued)

OTHER PUBLICATIONS

JP-2008144262-A; Jun. 2008, Anzai S; Ion Permeable Diaphragm patent and translation (Year: 2008).*
(Continued)

*Primary Examiner* — Walter D. Griffin
*Assistant Examiner* — Cameron J Allen

(57) ABSTRACT

An electrochemical cell including a first chamber having an anode, a second chamber having a cathode, at least one ionic connection between the first chamber and the second chamber, such that liquid electrolyte from the first chamber is prevented from mixing with liquid electrolyte in the second chamber is provided. The first chamber and the second chamber can be arranged in parallel and positioned remotely from each other. An electrochemical system including the electrochemical cell, and first and second sources of saline aqueous solutions is also provided. Water treatment systems are also provided. A method of operating an electrochemical
(Continued)

Voltage plot when 1.0 A (1000A/m2) current was drawn cell including introducing first and second saline aqueous solutions into first and second chambers of the electrochemical cell, and applying a current across the anode and the cathode to generate first and second products, respectively is also provided. A method of facilitating operation of an electrochemical cell is also provided.

23 Claims, 21 Drawing Sheets

Related U.S. Application Data on Mar. 8, 2017, provisional application No. 62/467,518, filed on Mar. 6, 2017.

(51) Int. Cl.

| | | |
|---|---|---|
| *C02F 1/461* | (2023.01) | |
| *C25B 9/23* | (2021.01) | |
| *C02F 103/08* | (2006.01) | |
| *C25B 1/26* | (2006.01) | |
| *C25B 15/02* | (2021.01) | |
| *C25B 15/031* | (2021.01) | |
| *C25B 9/17* | (2021.01) | |
| *C25B 15/029* | (2021.01) | |
| *C25B 1/30* | (2006.01) | |
| *C25B 1/04* | (2021.01) | |

(52) U.S. Cl.
CPC ......... *C02F 2201/4613* (2013.01); *C02F 2201/4614* (2013.01); *C02F 2201/46115* (2013.01); *C02F 2201/46135* (2013.01); *C02F 2201/46145* (2013.01); *C02F 2201/46175* (2013.01); *C02F 2209/04* (2013.01); *C02F 2209/06* (2013.01); *C02F 2209/23* (2013.01); *C02F 2209/30* (2013.01); *C02F 2209/40* (2013.01); *C02F 2303/04* (2013.01); *C25B 1/04* (2013.01); *C25B 1/26* (2013.01); *C25B 1/30* (2013.01); *C25B 9/17* (2021.01); *C25B 9/23* (2021.01); *C25B 15/02* (2013.01); *C25B 15/029* (2021.01); *C25B 15/031* (2021.01)

(56) References Cited

U.S. PATENT DOCUMENTS

| | | |
|---|---|---|
| 5,374,341 A | 12/1994 | Aoki et al. |
| 5,693,213 A | 12/1997 | Shimamune et al. |
| 6,638,413 B1 | 10/2003 | Weinberg et al. |
| 2002/0134687 A1 | 9/2002 | Nakajima et al. |
| 2003/0213704 A1 | 11/2003 | Scheper et al. |
| 2005/0082164 A1 | 4/2005 | Inamoto et al. |
| 2005/0173262 A1 | 8/2005 | Nakanishi et al. |
| 2006/0249393 A1 | 11/2006 | Ghosh et al. |
| 2007/0074975 A1* | 4/2007 | Buschmann ............. C25B 1/30 205/466 |
| 2010/0250449 A1 | 9/2010 | Doyle et al. |
| 2011/0024361 A1 | 2/2011 | Schwartzel et al. |
| 2011/0120958 A1 | 5/2011 | Frost |
| 2011/0198236 A1 | 8/2011 | Sumita et al. |
| 2012/0267256 A1 | 10/2012 | Kindred |
| 2014/0124377 A1 | 5/2014 | Joynt |
| 2015/0307371 A1* | 10/2015 | Fraim ..................... C02F 1/46 210/748.17 |
| 2016/0024669 A1 | 1/2016 | Jackson et al. |
| 2016/0115047 A1 | 4/2016 | Matsuyama et al. |
| 2017/0203980 A1 | 7/2017 | Buzaglo et al. |

FOREIGN PATENT DOCUMENTS

| | | |
|---|---|---|
| WO | 2016133985 A1 | 8/2016 |
| WO | 2017049052 A1 | 3/2017 |
| WO | 2017193135 A1 | 11/2017 |

OTHER PUBLICATIONS

WO 2013189670 A1; Inventor Information Name Benedetto Mariachiara; Date Filed May 16, 2013; Electrolytic Cell Equipped With Concentric Electrode Pairs (Year: 2013).*

Hawley, Andrew, "Examination report No. 2 for standard patent application", Australian Patent Application No. 2018231082, dated Jul. 17, 2023, 8 pages.

* cited by examiner

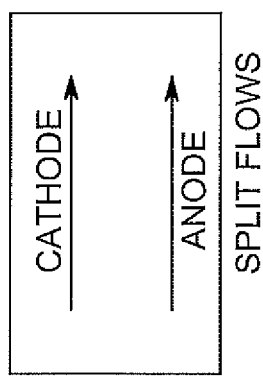
FIG. 15A SPLIT FLOWS
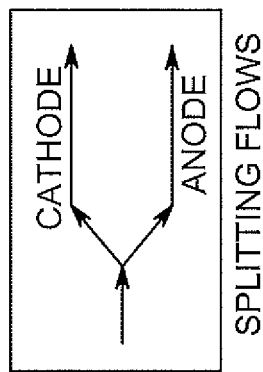
FIG. 15B SPLITTING FLOWS
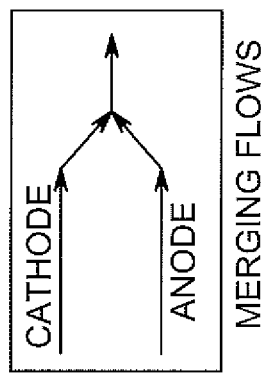
FIG. 15C MERGING FLOWS
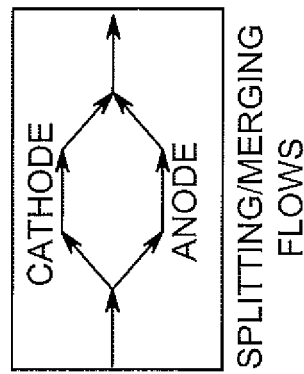
FIG. 15D SPLITTING/MERGING FLOWS

HALF-CELL ELECTROCHEMICAL CONFIGURATIONS FOR SELF-CLEANING ELECTROCHLORINATION DEVICES

CROSS-REFERENCE TO RELATED APPLICATIONS

This application claims priority under 35 U.S.C. § 119(e) to U.S. Provisional Application Ser. No. 62/468,544, filed on Mar. 8, 2017, titled "Implementation of Feedback Control for Improved Electrochemical System Design," U.S. Provisional Application Ser. No. 62/467,518, filed on Mar. 6, 2017, titled "Half-Cell Electrochemical Configurations for Self-Cleaning Electrochlorination Devices," and U.S. Provisional Application Ser. No. 62/469,224, filed on Mar. 9, 2017, titled "Pulsed Power Supply for Sustainable Redox Agent Supply for Hydrogen Abatement During Electrochemical Hypochlorite Generation," each of which is herein incorporated by reference in its entirety for all purposes.

FIELD OF TECHNOLOGY

Aspects and embodiments disclosed herein are generally directed to electrochemical devices, and more specifically, to electrochlorination cells and devices, methods of operating same, and systems utilizing same.

SUMMARY

In accordance with an aspect, an electrochemical cell is provided. The electrochemical cell may comprise a first chamber having an inlet and an outlet, an anode disposed within the first chamber, a second chamber having an inlet and an outlet, a cathode disposed within the second chamber, and at least one ionic connection between the first chamber and the second chamber, the ionic connection constructed and arranged to prevent liquid electrolyte in the first chamber from mixing with liquid electrolyte in the second chamber. The first chamber and the second chamber may be arranged in parallel and positioned remotely from each other.

In some embodiments, the ionic connection comprises at least one of a salt bridge and an ion-permeable membrane. The ion-permeable membrane may be selectively permeable to monovalent ions. The resistance per area of the ion-permeable membrane may be 1.0 $\Omega/mm^2$ or less. The resistance per area of the ion-permeable membrane may be 1.0 $\Omega/mm^2$ or less.

In some embodiments, the liquid electrolyte in the first chamber and the liquid electrolyte in the second chamber may have different compositions. The liquid electrolyte in the first chamber and the liquid electrolyte in the second chamber may have different salinities.

The first chamber may further comprise a recirculating channel extending between the outlet of the first chamber and the inlet of the first chamber. The second chamber may be a single-pass chamber. In some embodiments, the second chamber may further comprise a recirculating channel extending between the outlet of the second chamber and the inlet of the second chamber.

The electrochemical cell may further comprise a shared electrolyte channel which splits into a first channel fluidly connected to the first chamber and a second channel fluidly connected to the second chamber.

In some embodiments, the first chamber may be disposed within a first housing and the second chamber may be disposed within a second housing separate from the first housing.

In accordance with another aspect, a water treatment system may be provided comprising an electrochemical cell in fluid communication with a source of water and a source of an oxidant, and constructed and arranged to electrochemically generate $H_2O_2$ from the water.

In accordance with another aspect, a seawater treatment system may be provided comprising an electrochemical cell in fluid communication with a source of seawater and constructed and arranged to electrochemically generate NaOCl from the seawater.

In accordance with yet another aspect, an electrochemical system may be provided. The electrochemical system may comprise an electrochemical cell, a first source of a saline aqueous solution having an outlet fluidly connectable to the inlet of the first chamber of the electrochemical cell, and a second source of a saline aqueous solution having an outlet fluidly connectable to the inlet of the second chamber of the electrochemical cell. The electrochemical cell may comprise a first chamber having an inlet, an outlet, and an anode disposed within the first chamber, a second chamber having an inlet, an outlet, and a cathode disposed within the second chamber and positioned remotely from the first chamber, and at least one ionic connection between the first chamber and the second chamber.

In some embodiments, the first source of the saline aqueous solution may have a different salinity than the second source of the aqueous solution. The first source of the saline aqueous solution may comprise seawater and the second source of the saline aqueous solution may comprise brine. The system may further comprise a recirculation line extending between the outlet and the inlet of the first chamber.

The electrochemical system may further comprise a source of an oxidizing agent fluidly connectable to the second source of the saline aqueous solution upstream of the electrochemical cell. The electrochemical system may further comprise a sensor constructed and arranged to measure a concentration of at least one of a concentration of dissolved oxygen, a concentration of dissolved hydrogen, and hydrogen gas in the second chamber, and a controller configured to regulate a rate of introduction of the oxidizing agent into the second source of the saline aqueous solution responsive to at least one of the concentration of dissolved oxygen, the concentration of dissolved hydrogen, and the hydrogen gas being outside a predetermined range.

In some embodiments, the controller may be configured to regulate the rate of introduction of the oxidizing agent into the second source of the saline aqueous solution in an amount sufficient to prevent formation of hydrogen gas at the cathode during operation of the electrochemical cell. The source of the oxidizing agent may be constructed and arranged to deliver hydrogen peroxide to the second source of the saline aqueous solution from the outlet of the second chamber.

In some embodiments, at least one of the first source of the saline aqueous solution and the second source of the aqueous solution comprises seawater, brackish water, or brine.

In another aspect, there is provided a method of operating an electrochemical cell. The method may comprise introducing a first saline aqueous solution into a first chamber of an electrochemical cell comprising an anode, introducing a second saline aqueous solution into a second chamber of the electrochemical cell comprising a cathode, and applying a current across the anode and the cathode at a voltage sufficient to generate a first product compound from the first saline aqueous solution, generate a second product compound from the second saline aqueous solution, and selectively transfer monovalent ions across an ionic connection between the first chamber and the second chamber. The ionic connection may be constructed and arranged to prevent the first saline aqueous solution from mixing with the second saline aqueous solution.

The method may further comprise introducing the second saline aqueous solution having a different composition than the first saline aqueous solution. In some embodiments, the method may comprise introducing the first saline aqueous solution comprising seawater and introducing the second saline aqueous solution comprising brine.

The method may further comprise monitoring at least one parameter selected from a voltage applied across the anode and the cathode and a concentration of dissolved hydrogen in the second chamber. In some embodiments, the method may comprise applying the current across the anode and the cathode in a pulsed waveform responsive to the parameter being outside of a range sufficient to prevent generation of hydrogen gas within the second chamber. In some embodiments, the method may comprise reversing polarity of the anode and the cathode responsive to the parameter being outside of a range sufficient to prevent generation of hydrogen gas within the second chamber.

In yet another aspect, there is provided a method of facilitating operation of an electrochemical cell. The method may comprise providing an electrochemical cell, providing instructions for connecting a first source of a saline aqueous solution to the inlet of the first chamber, providing instructions for connecting a second source of a saline aqueous solution to the inlet of the second chamber, providing instructions for generating at least one of NaOCl and $H_2O_2$ in the electrochemical cell, and providing instructions for connecting at least one of the outlet of the first chamber and the outlet of the second chamber to a point of use. The electrochemical cell may comprise a first chamber having an inlet, an outlet, and an anode disposed within the first chamber, a second chamber having an inlet, an outlet, and a cathode disposed within the second chamber and positioned remotely from the first chamber, and at least one ionic connection between the first chamber and the second chamber.

In some embodiments, providing instructions for connecting the first source of the saline aqueous solution to the inlet of the first chamber may comprise providing instructions for connecting a source of seawater to the inlet of the first chamber. In other embodiments, providing instructions for connecting the second source of the saline aqueous solution to the inlet of the second chamber may comprise providing instructions for connecting a source of brine to the inlet of the second chamber.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 15A is a schematic illustration of a portion of one embodiment of an electrochemical cell;

FIG. 15B is a schematic illustration of a portion of another embodiment of an electrochemical cell;

FIG. 15C is a schematic illustration of a portion of another embodiment of an electrochemical cell;

FIG. 15D is a schematic illustration of a portion of yet another embodiment of an electrochemical cell.

DETAILED DESCRIPTION

Figure 1:
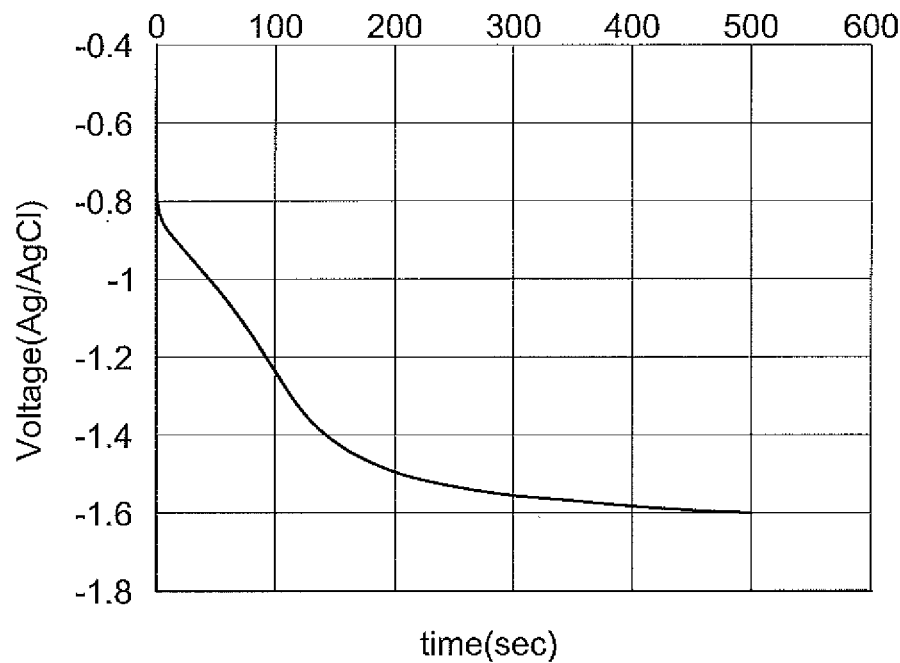
FIG. 1 is a graph of a change in applied voltage over time experienced when running an electrochemical cell.

Aspects and embodiments disclosed herein are generally directed to electrochemical devices to generate disinfectants such as sodium hypochlorite and to methods of abatement of hydrogen produced in such devices. The terms "electrochemical device" and "electrochemical cell" and grammatical variations thereof are to be understood to encompass "electrochlorination devices" and "electrochlorination cells" and grammatical variations thereof.

Aspects and embodiments disclosed herein are described as including one or more electrodes. The term "metal electrodes" or grammatical variations thereof as used herein is to be understood to encompass electrodes formed from, comprising, or consisting of one or more metals, for example, titanium, aluminum, or nickel although the term "metal electrode" does not exclude electrodes including of consisting of other metals or alloys. In some embodiments, a "metal electrode" may include multiple layers of different metals. Metal electrodes utilized in any one or more of the embodiments disclosed herein may include a core of a high-conductivity metal, for example, copper or aluminum, coated with a metal or metal oxide having a high resistance to chemical attack by electrolyte solutions, for example, a layer of titanium, platinum, a mixed metal oxide (MMO), magnetite, ferrite, cobalt spinel, tantalum, palladium, iridium, silver, gold, or other coating materials. "Metal electrodes" may be coated with an oxidation resistant coating, for example, but not limited to, platinum, a mixed metal oxide (MMO), magnetite, ferrite, cobalt spinel, tantalum, palladium, iridium, silver, gold, or other coating materials. Mixed metal oxides utilized in embodiments disclosed herein may include an oxide or oxides of one or more of ruthenium, rhodium, tantalum (optionally alloyed with antimony and/or manganese), titanium, iridium, zinc, tin, antimony, a titanium-nickel alloy, a titanium-copper alloy, a titanium-iron alloy, a titanium-cobalt alloy, or other appropriate metals or alloys. Anodes utilized in embodiments disclosed herein may be coated with platinum and/or an oxide or oxides of one or more of iridium, ruthenium, tin, rhodium, or tantalum (optionally alloyed with antimony and/or manganese). Cathodes utilized in embodiments disclosed herein may be coated with platinum and/or an oxide or oxides of one or more of iridium, ruthenium, and titanium. Electrodes utilized in embodiments disclosed herein may include a base of one or more of titanium, tantalum, zirconium, niobium, tungsten, and/or silicon. Electrodes for any of the electrochemical cells disclosed herein can be formed as or from plates, sheets, foils, extrusions, and/or sinters.

The term "tube" as used herein includes cylindrical conduits, however, does not exclude conduits having other cross-sectional geometries, for example, conduits having square, rectangular, oval, or obround geometries or cross-sectional geometries shaped as any regular or irregular polygon.

The terms "concentric tubes" or "concentric spirals" as used herein includes tubes or interleaved spirals sharing a common central axis, but does not exclude tubes or interleaved spirals surrounding a common axis that is not necessarily central to each of the concentric tubes or interleaved spirals in a set of concentric tubes or interleaved spirals or tubes or interleaved spirals having axes offset from one another.

This disclosure describes various embodiments of electrochlorination cells and electrochlorination devices, however, this disclosure is not limited to electrochlorination cells or devices and the aspects and embodiments disclosed herein are applicable to electrolytic and electrochemical cells used for any one of multiple purposes.

Electrochlorination cells are typically used in marine, offshore, municipal, industrial and commercial applications. The design parameters of electrochlorination cells, for example, inter-electrode spacing, thickness of electrodes and coating density, electrode areas, methods of electrical connections, etc., can be selected for different applications. Aspects and embodiments disclosed herein are not limited to the number of electrodes, the space between electrodes, the electrode material, material of any spacers between electrodes, number of passes within the electrochlorination cells, or electrode coating material.

Electrochemical devices that generate chemical reactions at electrodes are widely used in industrial and municipal implementations. Design and controls for current electrochlorination modules have remained static for a significant period of time. Two industry concerns with electrochemical cell function in these systems are cathodic scaling and hydrogen generation. Conventional methods of mitigating these problems limit the overall strength of hypochlorite that can be generated. There is a need for a system that addresses both of these concerns while efficiently generating hypochlorite.

Electrochlorination systems may generally be fed brine, brackish water, or seawater, although the feed solution is not limiting. Seawater generally has a salinity of between about 3.0% and 4.0%, for example, seawater may have a salinity of about 3.5%, 3.6%, or 3.7%. Seawater comprises dissolved ions including sodium, chloride, magnesium, sulfate, and calcium. Seawater may further include one or more of sulfur, potassium, bromide, carbon, and vanadium. Seawater may have a total dissolved solids (TDS) content of about 35,000 mg/l. Brine generally has a salinity of greater than about 3.5%. For example, brine may have a salinity of about 4.0%, 4.5%, 5.0%, 7.5%, or about 10%. Brine may have a TDS content of greater than about 35,000 mg/l. Saturated brine may have a salinity of up to about 25.0%. Brackish water generally has a salinity of less than 3.5%. Brackish water may have a salinity of about 3.0%, 2.5%, 2.0%, or 1.0%. Brackish water may have a TDS content of less than about 35,000 mg/l. For example, brackish water may have a TDS content between about 1,000 mg/l to about 10,000 mg/l.

Figure 8:
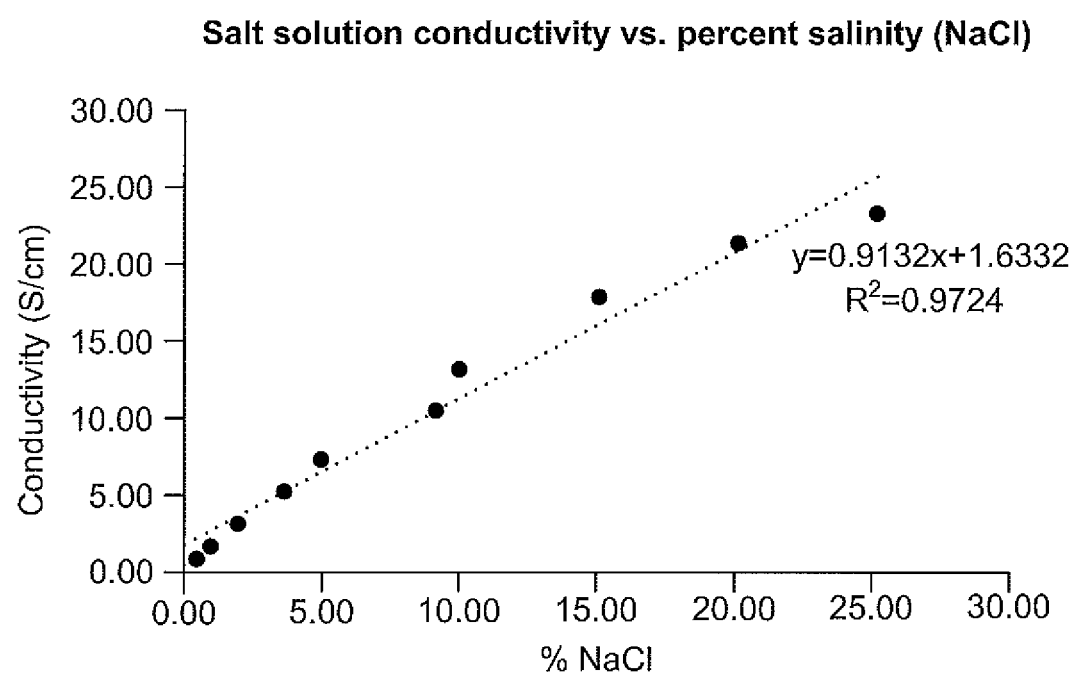
FIG. 8 is a graph of solution conductivity per salinity.

The feed solution may have a conductivity as shown in the graph of FIG. 8. In general, the conductivity of the feed stream may be between about 0 and 25 S/cm, as dependent on the salinity. Brackish water having a salinity between about 0.5% and 2.0% may have a conductivity of between about 0.5 S/cm and about 4.0 S/cm, for example, about 0.8 S/cm or about 3.0 S/cm. Seawater having a salinity of about 3.5% may have a conductivity of between about 4.5 S/cm and 5.5 S/cm, for example, about 5.0 S/cm or about 4.8 S/cm. Brine having a salinity between about 5.0% and 10% may have a conductivity of between about 7 S/cm and 13.0 S/cm, for example, about 12.6 S/cm. Saturated brine having a salinity of about 25% may have a conductivity of between about 20.0 S/cm and about 23.0 S/cm, for example, about 22.2 S/cm. In general, salinity and conductivity may follow the linear relationship of the graph of FIG. 8: y=0.9132x+1.6332, where y is conductivity (S/cm) and x is percent salinity (% NaCl).

For brine based systems, as pH changes during operation, operation of an electrochlorination system may result in $Cl_2$ and acid (for example, HCl) production at the anode and hydroxide and $H_2$ gas production at the cathode. Electrochemical reactions for the generation of sodium hypochlorite from sodium chloride and water (electrochlorination) include the following:

Reaction at anode: $2Cl^- \rightarrow Cl_2 + 2e^-$     ($E^0_{ox} = -1.358$ V)
Reaction at cathode: $2H_2O + 2e^- \; H_2 + 2OH^-$     ($E^0_{red} = -0.8277$ V)
In solution: $Cl_2 + 2OH^- \rightarrow ClO^- +$ -continued

| | |
|---|---|
| | $Cl^- + H_2O$ |
| Overall reaction: | $NaCl + H_2O \rightarrow NaOCl + H_2$ |

In these reactions, electrical potentials listed are under conditions of 1M concentration (activity) of the reactants and products as well as standard condition (25° C. and 1 atm.)

From the above reactions it can be seen that a byproduct of electrochemical production of sodium hypochlorite from sodium chloride and water is hydrogen. The production of hydrogen in an electrochlorination cell is undesirable. If sufficient hydrogen is produced such that the concentration of hydrogen exceeds the solubility limit of hydrogen in water, the hydrogen may evolve as hydrogen gas, which poses an explosion hazard. Hydrogen gas present in an electrochlorination cell may also shield portions of electrodes of the electrochlorination cells from contact with electrolyte in the cell, reducing the effective electrode area and reducing sodium hypochlorite generation efficiency. Further, diffusion of hydrogen into material such as titanium from which electrodes in electrochlorination cells are often formed may lead to embrittlement of the electrodes and increase the potential for mechanical failure of the electrodes.

The generation of $H_2$ gas necessitates the use of an apparatus and methods to remove or dilute hydrogen below explosive limits. Electrochlorination systems for the generation of sodium hypochlorite from sodium chloride and water are thus typically equipped with gas-liquid separators and/or blowers to remove hydrogen from solution and/or from the atmosphere or at least keep the concentration of hydrogen gas below a concentration at which it may ignite. However, these gas-liquid separators and/or blowers increase the capital and operating costs of the electrochlorination systems.

One approach to limiting hydrogen gas production is to introduce an oxidant into the system as described generally in International Application Publication No. WO 2017/049052, incorporated herein by reference in its entirety for all purposes. The reduction reaction of oxygen has a lower potential than that of hydrogen formation. The reactions are as follows:

| | |
|---|---|
| $2H_2O + 2e^- \rightarrow H_2 + 2OH^-$ | ($E^0 = -0.8277$ V) |
| $O_2 + 2H_2O + 4e^- \rightarrow 4OH^-$ | ($E^0 = 0.401$ V) |

The second reaction is a water reduction mechanism. The addition of oxygen to the chloride-containing aqueous solution may thus cause the chlorine and hydroxide generating reactions at the anode and cathode to be changed from:

| | | |
|---|---|---|
| A1: Reaction at anode: | $2Cl^- \rightarrow Cl_2 + 2e^-$ | ($E^0_{ox} = -1.358$ V) |
| C1: Reaction at cathode: | $2H_2O + 2e^- \rightarrow H_2 + 2OH^-$ | ($E^0_{red} = -0.8277$ V) |
| | | $E^0_{cell} = 2.19$ V |
| to: | | |
| A1: Reaction at anode: | $2Cl^- \rightarrow Cl_2 + 2e^-$ | ($E^0_{ox} = -1.358$ V) |
| C2: Reaction at cathode: | $O_2 + 2H_2O + 4e^- \rightarrow 4OH^-$ | ($E^0_{red} = 0.401$ V) |
| | | $E^0_{cell} = 0.96$ V |

The addition of the oxygen to the chloride-containing aqueous solution may eliminate the generation and/or accumulation of hydrogen in these reactions and also may reduce the voltage needed for production of the chlorine and hydroxide by more than half. The addition of the oxygen to the chloride-containing aqueous solution may thus not only reduce or suppress formation and/or accumulation of hydrogen as a byproduct of the generation of sodium hypochlorite from sodium chloride and water in an electrochlorination cell, but may also render the sodium hypochlorite generation process more energy efficient.

Oxygen supply can be a challenge, since the maximum oxygen solubility in pure water at ambient temperature and pressure is only approximately 5-10 ppm. One approach to overcoming the low solubility of oxygen is to inject oxygen under pressure greater than atmospheric pressure, to increase the solubility of the oxidizing agent in the aqueous solution, as compared to the solubility of the oxidizing agent in the aqueous solution under atmospheric pressure. However, certain systems may have physical limitations for pressure.

Aspects and embodiments disclosed herein include electrochemical cells for the formation of chemical compounds through the introduction of electrical energy, and to methods for constructing and operating such electrochemical cells. Specific reference will be made to electrochlorination cells configured to generate sodium hypochlorite from a chloride-containing (e.g., sodium chloride-containing) aqueous solution, for example, seawater, brackish water, or brine, although the disclosed features and methods are contemplated for use in other forms of electrochemical cells and for production of other chemical compounds as well.

An electrochemical cell may include two half cells. Each half cell typically contains an electrode and an electrolyte. The half cells may employ the same electrolyte or different electrolytes. In general, the chemical reactions in the electrochemical cell involve the electrode, the electrolyte, and/or an external substance. In a full electrochemical cell, and as described above with respect to electrochlorination cells, species from one half cell tend to lose electrons (oxidation) while species from another half cell tend to gain electrons (reduction) from the electrode. An ionic connection between half cells may enable ion transfer between the half cells. In some electrochemical cells, the ionic connection occurs in the shared electrolyte.

Where half cells are employed with different electrolytes, the ionic connection can provide ion transfer while preventing the electrolytes from mixing and causing unwanted side reactions. Generally, electrolytes may be prevented from mixing to reduce interference from species generated in one half cell, to prevent consumption of species generated in one half cell, or to enable each half cell to be operated at different parameters.

In an exemplary electrochlorination cell, seawater may be introduced as a common electrolyte to generate sodium hypochlorite, according to the reactions outlined above. The anode and cathode may be immediately adjacent (for example, within 1-5 mm from each other), allowing the half cell reactions to mix. High velocity flow (for example, 2-3 m/s) may be used to prevent precipitation of unwanted species at the cathode.

Generally, there is interplay between multiple parameters that affect the overall strength of the produced hypochlorite. Such parameters include, for example, feed composition, electrode design, applied current/voltage, pH, flow rate, oxidant concentration, and temperature. One or more of these parameters can be controlled to generate a suitable product. Additionally, one or more of these parameters can be controlled to limit undesirable effects, for example, hydrogen generation.

Electrochemical cell system performance may depend on the composition of the feed stream. By controlling the feed composition, it is possible to increase the concentration of hypochlorite production and decrease unwanted effects, such as hydrogen generation. While not wishing to be bound by any particular theory, it is believed that anode current and the concentration of NaCl in solution may have an effect on the rate at which $Cl_2$ is produced, which in turn may have an effect on the amount of NaOCl formed in solution. Thus, the amount of NaOCl formed relative to the volumetric flow rate of the system may be increased by controlling anode current and feed composition. At the cathode, current and current density may have an effect on the rate at which $H_2$ and $OH^-$ are produced. These production rates in turn may have an effect on pH and precipitate formation within the system.

The feed stream may comprise a saline aqueous solution, for example, seawater, brackish water, or brine. In some embodiments, controlling the NaCl concentration in the feed stream may control the amount of NaOCl formed. With a standard feed composition having $Na^+$ concentration between about 10,000 and 16,000 ppm and $Cl^-$ concentration between about 18,000 and about 23,000 ppm, NaOCl production can be increased by increasing a concentration of $Na^+$ and $Cl^-$. With such a standard feed composition, NaOCl output concentrations of up to about 2,000 ppm can be achieved.

In some embodiments, feed composition can be controlled by acid dosing. Acid injection can reduce pH, thus limiting formation of unwanted byproducts. In some embodiments, pH of the feed stream may be measured by a sensor. The measurement may be communicated to an acid injection system configured to dose the feed stream with acid, responsive to the pH measurement. Feed composition may be controlled by any other method of controlling pH as disclosed herein.

In certain embodiments, a portion of the product solution may be recirculated to the feed stream. The product solution may include, for example, $H_2O_2$ that can be recirculated as an oxidant. The ratio of recirculation to feed stream may be controlled, for example, with control valves. By recirculating a portion of the product solution to the feed stream, the overall strength of hypochlorite produced may be increased. Employing recirculation of product may reduce a required number of electrochemical cells necessary to produce a stable hypochlorite product, reducing overall footprint of the system and increasing options for end use.

Systems and methods disclosed herein may include electrochemical cells having features for abating, mitigating, minimizing, preventing, or eliminating scaling of the electrodes. In some embodiments, pH control may limit precipitation of unwanted byproducts at the cathode. During operation of a conventional electrochemical cell, local pH at the cathode can reach or exceed 11. Such high local pH may result in the precipitation of Mg and Ca ions, producing scaling on the electrode. In some embodiments, local pH at the cathode is controlled to between about 8 and 9. Average pH within the electrochemical cell may be controlled to between about 6 and 9, for example between about 7 and 8.

Feedforward control of pH may be implemented. In some embodiments, pH of the feed is measured with a sensor. One or more parameters of the system may be adjusted responsive to the pH measurement. For instance, feed composition, flow rate, applied current/voltage, or oxidant concentration at one or more electrode may be adjusted to control pH within a desired range. In some embodiments, pH may be controlled by the addition of a pH adjuster, for example a mineral acid or a caustic such as NaOH. The measurement may be communicated to an injection system which may adjust one or more operating parameters to control pH. The injection system may control pH of the feed solution or of a solution within the electrochemical cell. Additionally, or alternatively, feedback control of pH may be implemented. For instance, pH of a product may be measured with a sensor. One or more parameters may be adjusted as described or the measurement may be communicated to an injection system which may adjust one or more operating parameters as described.

Systems and methods disclosed herein may employ a periodic polarity reversal of the anode and cathode to mitigate, minimize, prevent, or eliminate generation or accumulation of hydrogen gas at the cathode, for example, by controlling local pH at the electrodes. In some electrochemical cells, polarity is reversed after a long period of operation to reduce scaling, for example every 12 hours or every other day of operation. As disclosed herein, polarity may be reversed more often to limit hydrogen gas formation. For instance, polarity may be reversed every few minutes to limit formation of hydrogen gas, depending on system conditions.

Reversing polarity to limit formation of hydrogen gas may also limit formation of scaling. During operation of the electrochemical cell, localized acid generation typically occurs at the anode, while hydrogen and byproducts accumulate at the cathode. By reversing polarity, acid may be generated at the former cathode (now-anode), limiting the localized production of hydrogen gas and precipitates at the cathode. The acid generation at the now-anode may also control localized pH, minimizing the further precipitation of byproducts at the electrode, and preventing scaling.

The polarity reversal sequence may occur symmetrically or asymmetrically. In some embodiments, polarity is reversed every few minutes, for example, every 2, 5, 10, 15, 20, 30, 40, 50, or 60 minutes. In some embodiments, polarity is reversed every few hours, for example, every 1, 2, 3, 4, 5, 6, 7, 8, 9, 10, 11, 12, 18, or 24 hours. Each polarity reversal may last between a few minutes to several hours. The type and length of the polarity reversal cycle is not limiting. Generally, the type and length of the polarity reversal cycle may depend on the feed composition and conditions of the electrochemical cell. The type and length of polarity reversal may depend on average pH within the electrochemical cell or localized pH at the anode or cathode. In some embodiments, polarity reversal may be implemented responsive to a pH measurement outside a desired range.

Temperature can have an effect on product formation and reaction rates. In some embodiments, temperature is controlled to between about −2 to 45° C. Outside this temperature range, the feed solution may react with the electrode catalyst to form unstable byproducts. Feedback or feedforward control of temperature may be implemented. In some embodiments temperature of the feed or product solution is measured with a thermometer. One or more parameters of the system may be adjusted responsive to the temperature measurement. For example, flow rate, pH, temperature, or dissolved oxygen concentration can be adjusted responsive to the measurement. Temperature may be adjusted, for example, with a heat exchanger.

Systems and methods disclosed herein include electrochemical cells having features for abating, mitigating, minimizing, preventing, or eliminating the formation of hydrogen gas in the electrochemical cell and/or hydrogen dissolved in an electrolyte in the electrochemical cell. Implementation of hydrogen abatement may be a function of current density, flow rate, dissolved hydrogen concentration, and/or dissolved oxygen concentration (optionally, as a function of pressure). Furthermore, hydrogen gas generation may be a function of temperature, pH, composition, and oxidation-reduction potential of the solution proximate the cathode in the electrochemical cell. The relationship between these parameters can be quantified by scanning current and voltage and plotting an IV-curve. A transition point from water generation to $H_2$ production can be identified from the IV-curve. The IV-curve displays an inflection point when voltage exceeds a threshold that indicates production of hydrogen gas. Overall system performance can be calibrated by adjusting the aforementioned parameters.

Methods disclosed herein may comprise applying current across the anode and the cathode at a voltage sufficient to generate product compound. The current may be applied in a constant mode until a change is required. For example, current may be applied constantly until a polarity reversal or anode and cathode is to be applied or current is to be applied in a pulsed waveform. Such a change may occur, for example, when one or more parameter indicates that hydrogen gas may be generated at the cathode.

Generally, as a safety measure, $H_2$ gas emissions may be monitored and controlled. $H_2$ gas may be measured with a sensor. One or more of the methods disclosed herein may be implemented in response to a high measurement of $H_2$ gas in the product or within the system.

Voltage across the anode and the cathode can be measured to determine when hydrogen gas begins to generate in the electrochemical cell. Parameters such as temperature, pH, and composition of the fluids may affect the voltage at which hydrogen gas begins to be generated. Pressure may increase diffusivity of oxygen in the fluid, thus increased pressure, flow rate, and turbulence may also have an effect on the voltage at which hydrogen gas begins to be generated. As shown in the graphs of FIGS. 14A-14D, an inflection point in the IV-curve indicates the voltage at which hydrogen gas is generated.

Figure 14A:
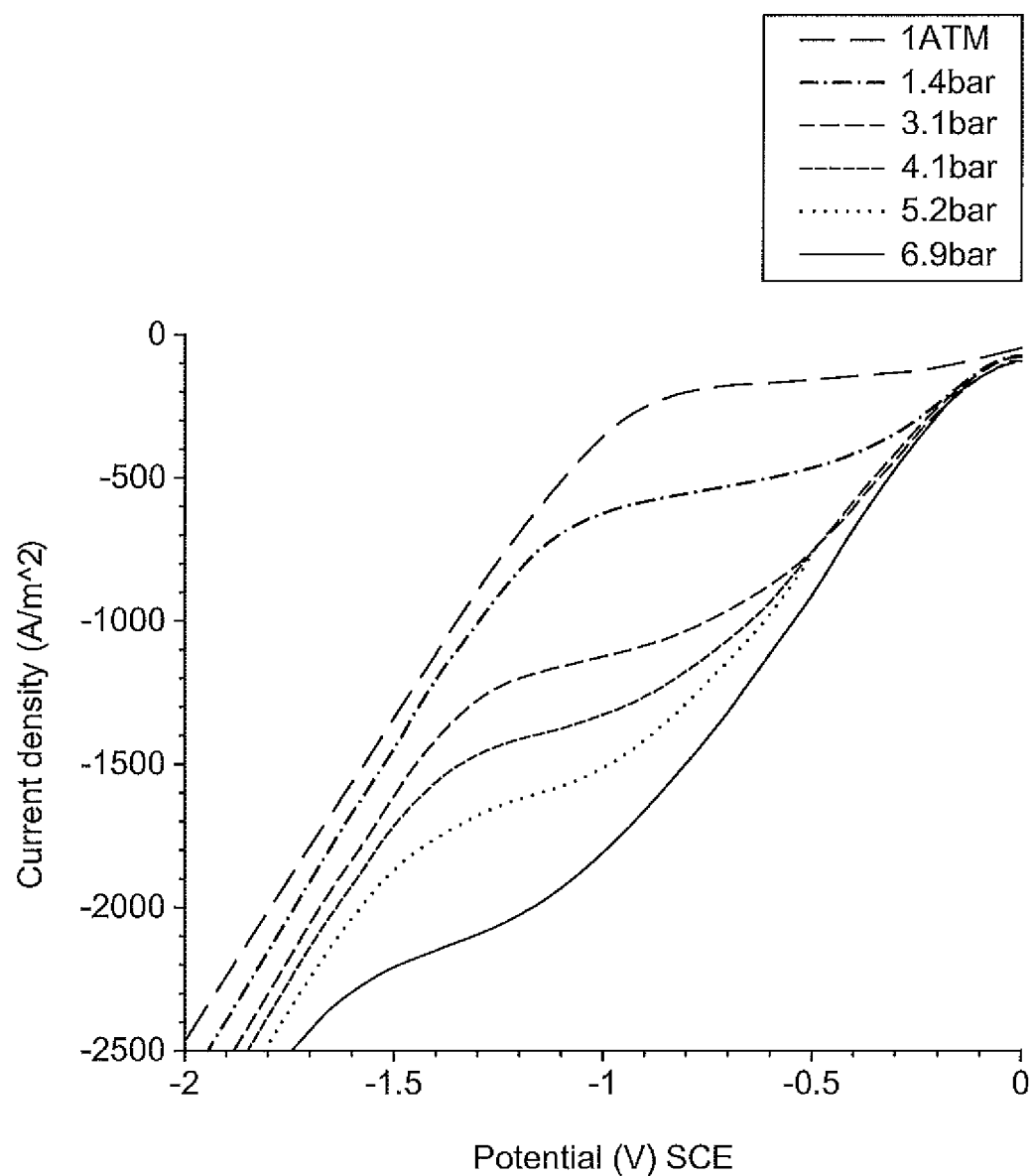
FIG. 14A is an IV-curve of the system operating at a certain set of parameters, according to one embodiment.
Figure 14B:
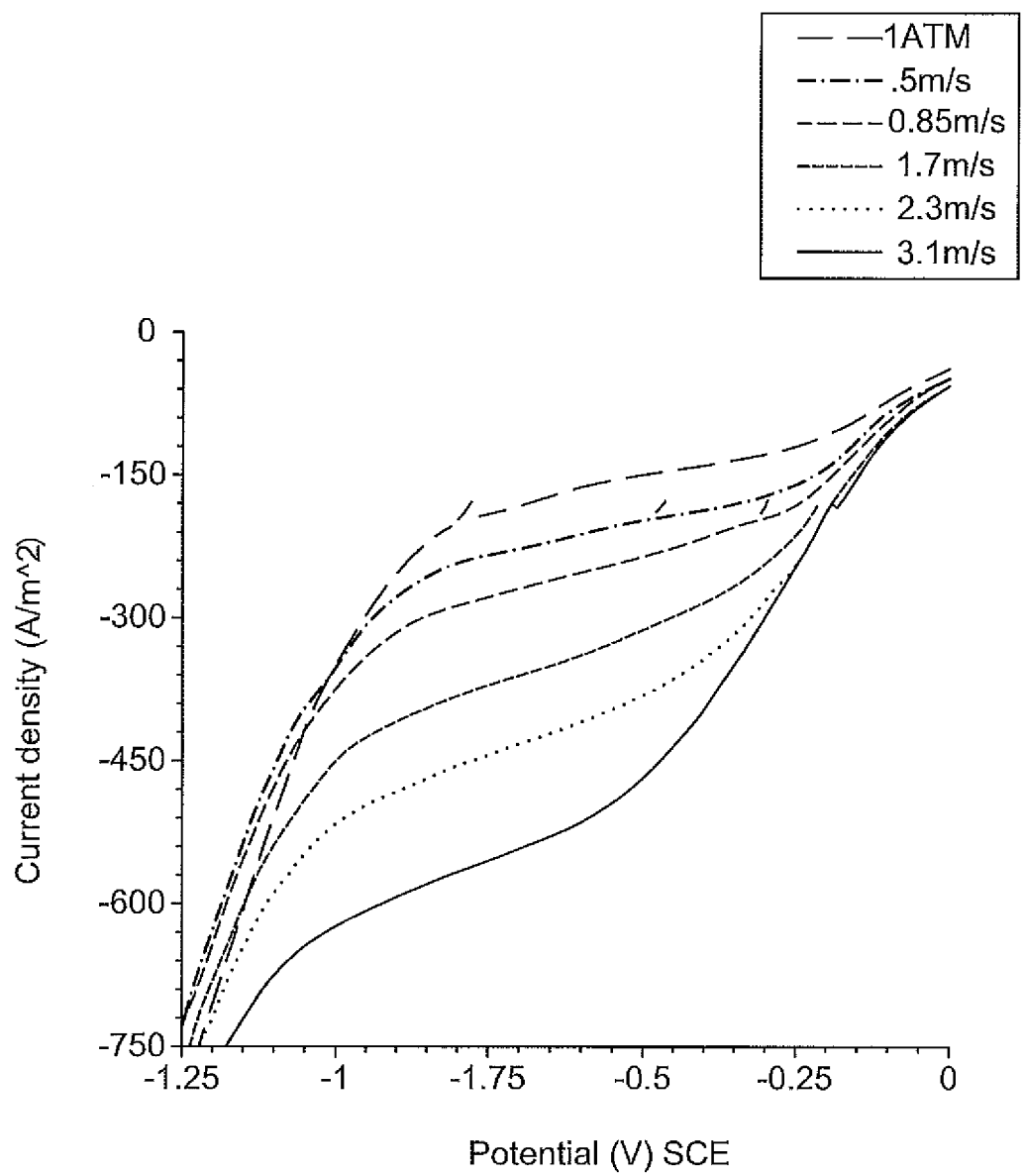
FIG. 14B is an IV-curve of the system operating at a certain set of parameters, according to another embodiment.
Figure 14C:
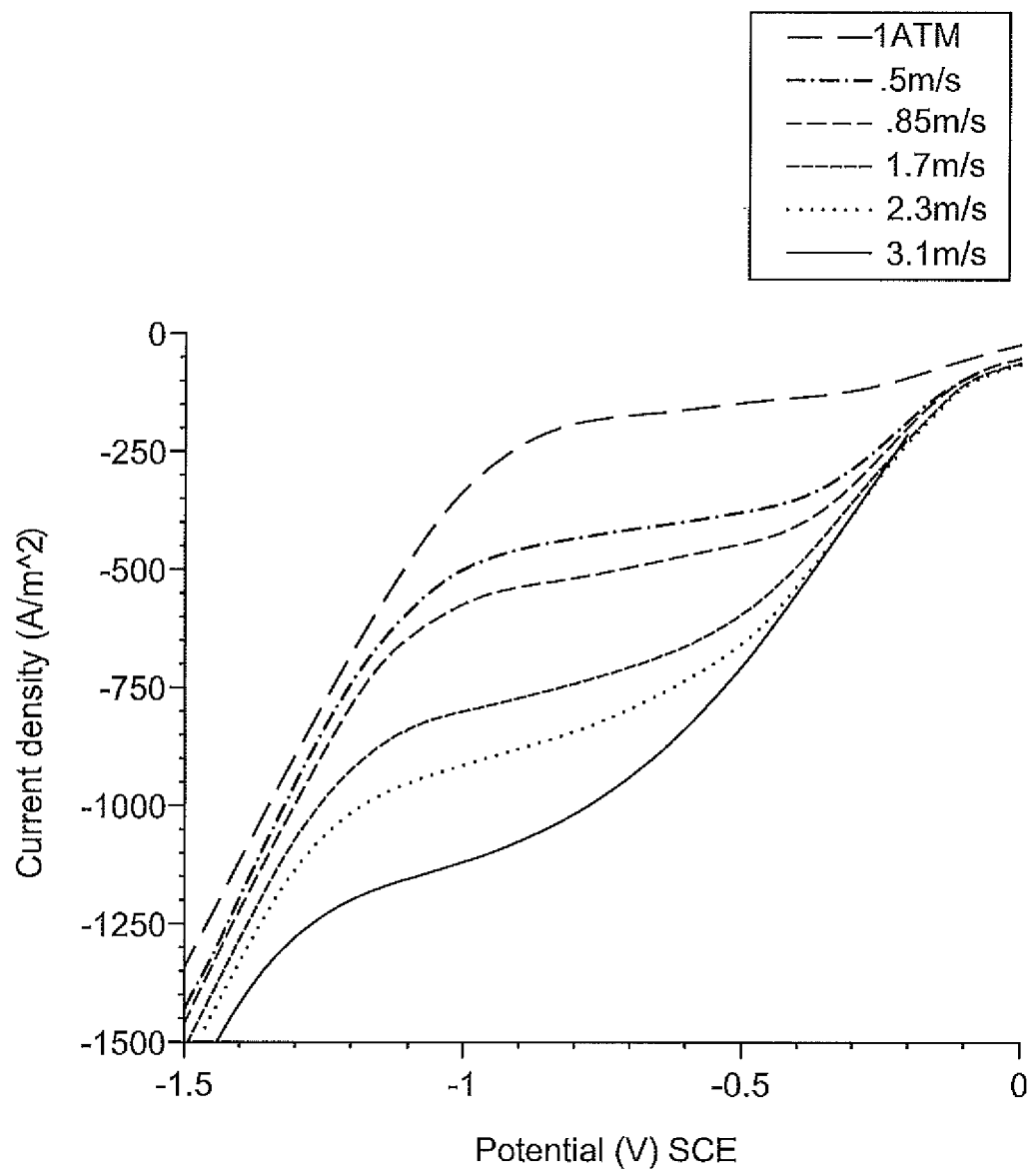
FIG. 14C is an IV-curve of the system operating at a certain set of parameters, according to another embodiment.
Figure 14D:
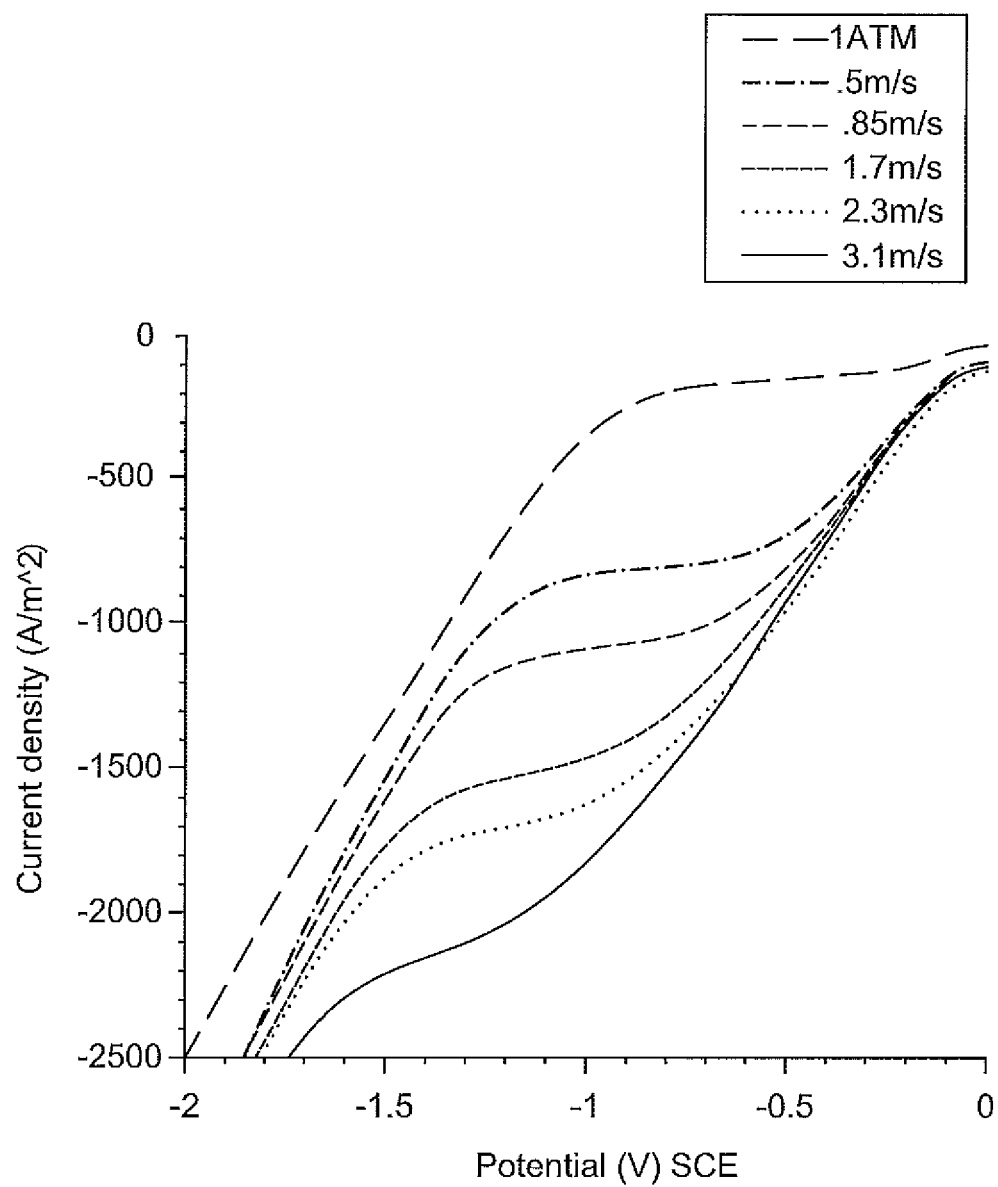
FIG. 14D is an IV-curve of the system operating at a certain set of parameters, according to yet another embodiment.

The data presented in FIG. 14A show the change in inflection point (between about 1.0V and about 1.5V) for a flow rate of 3.1 m/s at varying pressure. The data presented in FIG. 14B show the change in inflection point (between about 0.8V and about 1.1V) for oxygen injected at a pressure of about 1.4 bar at varying flow rates. Air introduced at about 6.9 bar can generate a dissolved oxygen content similar to oxygen injected at 1.4 bar. The data presented in FIG. 14C show the change in inflection point (between about 1.0V and about 1.3V) for oxygen injected at about 3.1 bar at varying flow rates. The data presented in FIG. 14D show the change in inflection point (between about 1.0V and about 1.5V) for oxygen injected at about 6.9 bar at varying flow rates.

In some embodiments, voltage may be maintained within or below any of the above identified ranges to limit hydrogen gas generation in the electrochemical cell. Voltage may be maintained below about 0.8V, 0.9V, 1.0V, or 1.1V for a system introducing oxygen at 1.4 bar or air at 6.9 bar depending on the flow rate. Voltage may be maintained below about 1.0V, 1.2V, or 1.3V for a system introducing oxygen at about 3.1 bar depending on the flow rate. Voltage may be maintained below about 1.0V, 1.1V, 1.2V, 1.3V, 1.4V, or 1.5V for a system introducing oxygen at about 6.9 bar depending on the flow rate. Voltage may be maintained below about 1.0V, 1.1V, 1.2V, 1.3V, 1.4V, or 1.5V for a system running a flow rate of about 3.1 m/s depending on the voltage. Further parameters may be determined from the graphs shown in FIGS. 14A-14D.

In some embodiments, conditions are controlled to maintain the system within the predetermined parameters that are associated with no formation of hydrogen gas. Current applied across the anode-cathode pair may be altered or reversed responsive to the parameters indication conditions which may result in hydrogen gas generation. Depending on the system parameters, conditions may be controlled to maintain the voltage below about 4.0V, 3.0V, 2.0V, 1.5 V, 1.0 V, or 0.5V. The parameters may be controlled to maintain the voltage between about 1.5V and about 0.5V. The parameters may be controlled to maintain the voltage between about 1.5V and about 4.0V. The parameters may be controlled to maintain the voltage between about 0.5V and about 4.0V.

In some embodiments, the addition of an oxidant (for example, oxygen) to the process solution may eliminate the generation and/or accumulation of hydrogen in these reactions. The addition of an oxidant may also reduce the voltage needed for production of the chlorine and hydroxide by more than half. Thus, in some embodiments, the addition of an oxidant may not only reduce or suppress formation and/or accumulation of hydrogen as a byproduct of the generation of sodium hypochlorite from sodium chloride and water in an electrochlorination cell, but may also render the sodium hypochlorite generation process more energy efficient.

In addition to, or as an alternative to air or oxygen, the oxidizing agent may include any one or more of oxygen enriched air, ozone, carbon dioxide, hydrogen peroxide, fluorine, chlorine, bromine, iodine, nitric acid, nitrous oxide, a nitrate, sulfuric acid, peroxysulfuric acid, peroxymonosulfuric acid, a hexavalent chromium compound, a permanganate compound, sodium perborate, potassium nitrate, or any other known oxidizing compound known. The oxidizing agent may be a gas, a solid, or a liquid phase agent. The oxidizing agent may include a product of the electrochemical cell. For example, the oxidizing agent may be $H_2O_2$ produced by the electrochemical cell. The oxidizing agent may include any chemical compound having a sufficiently low reducing potential to intercept electrons from passing into a water molecule to generate free hydrogen. The oxidizing agent may include any chemical compound having a reducing potential that is less negative than −0.8277 volts versus a standard hydrogen electrode. The reducing potential of the oxidizing agent may vary based on kinetic factors such as concentration, temperature, and the effect of a catalyst.

Introducing the oxidizing agent into a process solution may include contacting the solution with the oxidizing agent gas or injecting an oxidizing agent-containing liquid into the solution. The oxidizing agent may be introduced into the feed stream or another process solution. In some embodiments, the oxidizing agent gas is an oxygen-containing gas. The oxidizing agent-containing liquid may be an oxygen-containing liquid.

Control of a dissolved oxygen concentration may be implemented. In some embodiments, dissolved oxygen concentration may be measured in the feed or within the system with a sensor. The measurement may be communicated to an injection system which may introduce oxygen gas or dissolved oxygen in solution to control the concentration of dissolved oxygen within the system. In some embodiments, dissolved oxygen concentration is controlled to be within about 1-100 ppm. Dissolved oxygen concentration may be controlled to at least about 1 ppm, 5 ppm, 10 ppm, 20 ppm, 30 ppm, 40 ppm, 50 ppm, 60 ppm, 70 ppm, 80 ppm, 90 ppm, 95 ppm, or 100 ppm. Dissolved oxygen concentration may be increased by injecting the oxidant under pressure or introducing the aqueous solution under pressure.

In some embodiments, oxidation reduction potential (ORP) can be measured in the feed, within the system, or at the product with a sensor. Any one or more parameters of the system may be adjusted responsive to the ORP measurement. For example, dissolved oxygen concentration, flow rate, pH, temperature, or feed composition can be adjusted responsive to the ORP measurement.

Composition of the solution within the system may be altered by altering flow rate or velocity of the feed stream. Generally, increasing flow rate or velocity may increase turbulence and mixing of the solution within the system. Since reactions typically occur locally at the anode or cathode of the electrochemical cell, increasing turbulence may have an effect on normalizing solution composition and pH within the system. In particular, increasing turbulence or flow rate may increase a rate of production of product, for example, $H_2O_2$ or NaOCl, and decrease a rate of generation of unwanted hydrogen gas.

Feedback or feedforward control of flow rate or velocity may be implemented. In some embodiments, flow rate or flow velocity of the feed is measured with a flow meter. One or more parameters of the system may be adjusted responsive to the flow rate or velocity measurement. For example, flow rate or velocity, pH, temperature, or dissolved oxygen concentration can be adjusted responsive to the measurement. The measurement may be communicated to a circulation pump to control flow rate or velocity as necessary. Flow rate may be controlled to be between about 0.1-10 $m^3$/hr. Flow rate may be controlled to be 0.1 $m^3$/hr, 0.5 $m^3$/hr, 1.0 $m^3$/hr, 2.0 $m^3$/hr, 3.0 $m^3$/hr, 4.0 $m^3$/hr, 5.0 $m^3$/hr, 6.0 $m^3$/hr, 7.0 $m^3$/hr, 8.0 $m^3$/hr, 9.0 $m^3$/hr, 9.5 $m^3$/hr, or 10 $m^3$/hr.

Flow velocity may be controlled between about 1.0 m/s and 4.0 m/s. Flow velocity may be controlled to be about 1.0 m/s, 2.0 m/s, 3.0 m/s, or 4.0 m/s. In some embodiments, flow velocity can be controlled to between about 2.0 and 2.5 m/s. Flow velocity can be controlled to between about 2.5 m/s and 3.0 m/s. Flow velocity can be controlled to be between about 3.0 m/s and 3.5 m/s. In some embodiments, flow velocity can be controlled to be about 2.0 m/s, 2.1 m/s, 2.2 m/s, 2.3 m/s, 2.4 m/s, 2.5 m/s, 2.6 m/s, 2.7 m/s, 2.8 m/s, 2.9 m/s, 3.0 m/s, 3.1 m/s, 3.2 m/s, 3.3 m/s, 3.4 m/s, or 3.5 m/s. Flow rate or velocity may be increased or decreased as necessary to increase or decrease turbulence and mixing. For example, a concentric tube electrochlorination cell may be employed in marine and offshore applications with seawater as feed. The liquid velocity through the cell can be about 2.1 m/s, resulting in highly turbulent flow which may reduce the potential for fouling and scaling on the electrode surfaces.

Additionally, one or more parameters of the product or within the system may be measured to determine a required adjustment of flow rate or flow velocity. For example, flow rate or velocity may be increased or decreased based on a measurement of local pH within the system or composition of the product. Flow rate or velocity may be increased where local pH within the system varies widely to neutralize pH, or where a measurement of the product indicates that there may be scaling of the electrodes.

In some embodiments, pH of the system and local pH at the cathode can be controlled by adjusting flow rate or velocity. The bulk pH of feed water is generally in a neutral range. For example, pH of seawater is typically between about 7.5 and 8.4. However, the kinetics of the reactions occurring within the electrochemical cell may drive up pH within the system. As previously described, local pH around the cathode can exceed 10 or 11. Local $OH^-$ concentration at the cathode can be increased by increasing velocity (i.e., turbulence and mixing). In some embodiments, flow rate is increased to increase local $OH^-$ concentration at the cathode. Thus, in some embodiments, flow rate or velocity is increased to decrease local pH at the cathode.

At concentrations above its solubility, $H_2$ may outgas as it is produced, displacing fluid volume and blinding the cathode. In some embodiments, flow rate and velocity may be controlled to decrease local fluid volume at the cathode. By decreasing local fluid volume while maintaining the same $OH^-$ production rate, local pH at the cathode may be increased. Flow rate and velocity may be controlled to ensure an adequate volume at the electrodes for the reactions.

Systems and methods may be operated at a controlled current density. In some embodiments, current density is controlled to generate product solution while suppressing hydrogen generation. The current density corresponding to induced hydrogen generation may vary with other parameters. In one example, for an exemplary feed stream (brine) that is exposed to air at atmospheric pressure, hydrogen generation may begin at a current density of about $-200$ $A/m^2$. In contrast, for the same feed stream being exposed to air at 6.9 bar, hydrogen generation may not begin until about $-2,250$ $A/m^2$. Thus, elevated pressure of dissolved oxygen in feed may provide for a significant change in current density, and a resulting increase in the amount of sodium hypochlorite that can be generated prior to the onset of hydrogen generation. Similarly, increasing flow rate or oxygenation of the feed stream may allow the electrochemical device to operate at higher current densities, and thus to produce more product solution before hydrogen generation begins. In some embodiments, current density is optimized (i.e., increased) to generate product solution while suppressing hydrogen generation. Depending on the parameters, current density may range between about $-200$ $A/m^2$ and $-3,000$ $A/m^2$.

Current may be increased by operating with a high linear flow velocity. Without being bound to a particular theory, it is believed that with increased flow rate of the feed stream oxygen consumed by reaction with hydrogen may be more quickly replenished by fresh feed. Increasing the flow rate of the feed stream thus may provide for the electrodes to operate at higher current densities, and produce more product solution before hydrogen generation begins. In some embodiments, increased oxygenation may similarly increase current, for example, either by increasing flow rate or increasing availability of oxidant in the feed stream.

The current across the anode-cathode pair may be applied at a voltage sufficient to generate product solution. Generally, the electrochemical cell may be designed to operate at an applied current/voltage that enables all or substantially all of the hydrogen to react with oxygen supplied by the feed stream. In some embodiments, the current/voltage applied across the anode-cathode pair may be controlled to limit generation of free hydrogen. In some embodiments, current and voltage can be measured across the electrode pair with an electrical sensor. For example, a potentiostat may be utilized to measure electrical parameters and generate a current-voltage curve. Any one or more parameters of the system may be adjusted responsive to the electrical measurement. For example, applied current and voltage can be adjusted accordingly. In some embodiments, flow rate or feed composition (for example, oxidant concentration) can be adjusted responsive to the electrical parameter measurement.

Additionally, variations in total dissolved solids (TDS) of the feed stream may affect its conductivity. Cell voltage and conductivity are inversely related. Thus, in some embodiments, overall power consumption of an electrochemical cell can be controlled by controlling TDS concentration in the feed stream. Feed stream TDS concentration may be controlled by selectively introducing either seawater, brackish water, or brine. Conductivity of the feed stream or product stream may be measured with a sensor. Any one or more parameters of the system may be adjusted responsive to the conductivity measurement. In some embodiments, flow rate, feed composition, or pH may be adjusted responsive to the conductivity measurement. In some embodiments, oxidant may be overdosed to reach a saturation limit of the oxidant in the feed stream. As previously described, the solubility limit of oxygen can be a challenge to eliminating the generation and/or accumulation of hydrogen within the electrochemical cell. In some embodiments, the dissolved oxygen concentration may be increased by increasing feed stream pressure or increasing the pressure of injected oxidant (for example, oxygen or air). The amount of oxygen overdosing may be dependent on, for example, flow conditions or turbulence within the electrochemical cell, diffusivity of oxygen within the electrochemical cell, operating current, cathode area, etc.

The oxidant may be injected under pressure greater than atmospheric pressure to increase the solubility of the oxidant in the feed stream or process solution as compared to the solubility of the oxidant in solution under atmospheric pressure. For example, oxygen, air, and/or another oxidant may be introduced into the feed stream at an elevated pressure of from about 1 bar gauge to about 7 bar gauge, about 3 bar gauge to about 5 bar gauge, or at any other pressure desired to introduce a desired amount of oxidant into the solution. In some embodiments, the oxidant may form microbubbles in the electrochemical cell as the oxygenated feed enters the electrochemical cell. The pressure applied to the oxygenated aqueous solution may be reduced relative to the pressure applied to the feed stream during introduction or exposure to the oxidizing agent.

In accordance with certain embodiments, the electrodes may apply power in a pulsed waveform to limit or eliminate factors that inhibit electrochemical reactions such as polarization and surface adsorption. Applying power in a pulsed waveform may minimize polarization on the electrode surface and mitigate blocking of the electrode surface due to adsorption. Generally, when a cathode is used to reduce dissolved oxygen, its surface may become blocked with ionic species. A corresponding increase in voltage is required to maintain a constant current. The reduced surface catalysis sites may result in an increased current density or potential at the electrode.

The temporary surface adsorption block on the electrode may be reversible. While not wishing to be bound by any particular theory, it is believed that applying a pulsed waveform may overcome depletion, presumably resulting from the temporary surface adsorption block. The pulsed waveform may deliver electrons for the electrolysis reaction to avoid electrode surface deactivation resulting from polarization, surface adsorption, and other processes that cause oscillation between active and passive modes. In some embodiments, the pulsed waveform may be applied by coupling a non-electrochemical pulse with an electrochemical pulse to improve reaction efficiency.

A pulsed DC waveform may be used to provide intermittent reaction and relaxation modes for an electrochemical reaction. For example, the pulsed waveform may be applied to reversibly alternate an electrode between an "active" and "deactivated" state during steady state DC operation. The pulsed waveform may be applied to any electrochemical reaction. The pulsed waveform may be applied to any electrode, catalyst coated or otherwise. The pulsed waveform may be especially beneficial when using electrochemistry to generate chemicals, such as hypochlorite, which tend to produce undesirable byproducts, for example, hydrogen. The pulsed waveform may be applied when the catalytic electrode is reacting with a redox molecule in solution to prevent formation of $H_2$ gas.

In some embodiments, the active and deactivated states may comprise an increase/decrease in magnitude of applied current, respectively. The active and deactivated states may comprise an on/off mode operation. The active and deactivated states may comprise a reversal of electrical current, such that the anode and cathode electrodes reverse function periodically. By operating in a pulsed waveform, the electrolysis cell may run with less potential. The shaped of the pulsed waveform is non-limiting. The shape may comprise a square wave, a sine wave, a triangular wave, or other shapes. The pulse may be symmetrical or asymmetrical. For example, the pulse shape may be the result of a random waveform generation. The timing between pulses may be regular or irregular.

The pulsed waveform may be designed to optimize reduction of dissolved oxygen while limiting generation of hydrogen. For example, the pulse may be designed to run as long as possible until calculated that hydrogen will generate or until hydrogen is detected. In some embodiments, power is applied in a pulse of less than 500 seconds, less than 200 seconds, or less than 100 seconds. For example, current may be run in a pulsed mode having a duration of about 90 seconds, 80 seconds, 70 seconds, 60 seconds, 50 seconds, 40 seconds, 30 seconds, 20 seconds, or 10 seconds for each pulse. Additionally, such pulsed power supply may result in a cathodic potential of less than 1.6 volts, 1.5 volts, 1.3 volts, or 1.0 volts. Other embodiments of pulse timing and cathodic potential may be extrapolated from the data presented in FIG. 1. For example, power may be applied in a pulse lasting between 0 and 500 seconds, to limit voltage to the corresponding cathodic potential, as shown in FIG. 1.

Electrode design may affect one or more parameters described herein. In some embodiments, the dissolved oxygen concentration can be increased by employing a porous carbon based electrode. The carbon based electrode may have a specific surface area of less than about 10 $m^2/g$. The current density passed on such an electrode is generally low, while the respective total current density is generally less than 5,000 $A/m^2$. In some embodiments, the total current density is less than 4,000 $A/m^2$, less than 3,000 $A/m^2$, less than 2,000 $A/m^2$, less than 1,500 $A/m^2$, or less than 1,000 $A/m^2$.

In some embodiments, a catalyst may be incorporated on the surface of the electrode to mitigate the generation and/or accumulation of hydrogen. The catalyst may be employed to promote the formation of water from dissolved oxygen and generated hydrogen. Typically, the catalyst may be incorporated on the surface of a cathode, where hydrogen gas is generated. The catalyst may comprise a platinum series metal, a noble metal, a rare earth metal, an oxide, or a combination thereof. Exemplary catalysts include rare earth metal oxides, for example, iridium and ruthenium oxides, and other mixed metal oxides (MMO). The catalyst may comprise tin, titanium, tantalum, or antimony. The MMO may comprise platinum. In some embodiments, the coating may be deposited through electrodeposition or thermal deposition.

The porous carbon based electrode, when combined with a platinum catalyst, may suffer from poor mechanical strength, catalyst instability, and electrode blockage. In some embodiments, the electrodes may be non-porous. For example, the electrodes may be a platinum-plated titanium electrode. The platinum-plated titanium electrode with a geometric surface area may be combined with any of the approaches discussed above, namely, increasing feed stream or oxidant pressure, operating at a high linear flow velocity, or applying a pulsed waveform power supply.

The electrode surface area to volume ratio can be manipulated through selection of factors such as electrode thickness, inter-electrode spacing, as well as overall cell size. Electrode composition and surface area may be selected to permit polarity reversal. In some embodiments, the anode and cathode are of substantially equal area. In some embodiments, the anode and cathode are both coated with a catalyst. The substantially equal area and catalyst composition of both electrodes promotes interchangeability of anode and cathode, allowing polarity reversal of the electrodes to mitigate scaling.

Systems may also be designed to promote efficient pulsed power supply. A deactivated electrode during pulsing may be recovered when not in operation or at an opposite potential. In some embodiments, systems disclosed herein may contain multiple electrodes at each anode and cathode. During operation, one electrode may be activated while another electrode is deactivated, i.e., recovering for operation. The activated and deactivated state of each electrode may be reversible. Between pulses, the previously-deactivated electrode may be activated while the previously-activated electrode may be deactivated for recovery.

Figure 2:
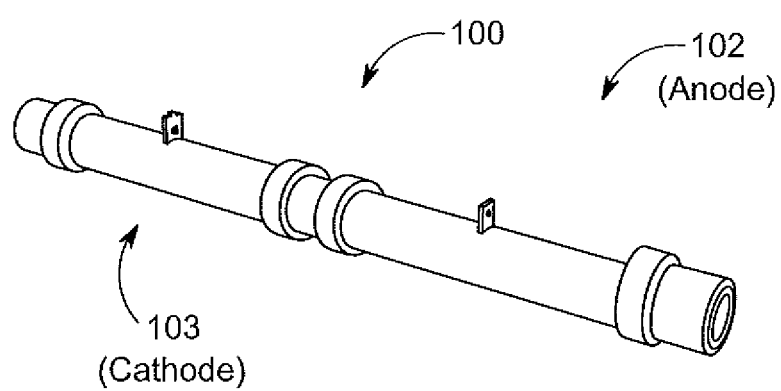
FIG. 2 is an isometric view of one embodiment of an electrochemical cell.

An exemplary electrochemical cell 100 is shown in FIG. 2. The electrochemical cell 100 includes an anode 102 and cathode 103 disposed within a housing. The electrodes may be arranged in series, as shown in FIG. 2. In some electrochemical cells, the electrodes may be arranged in parallel, as shown in the embodiments of FIGS. 15A-15D. The electrodes may be in fluid communication through direct flow in series, splitting flows, merging flows, or a combination of these.

Figure 18:
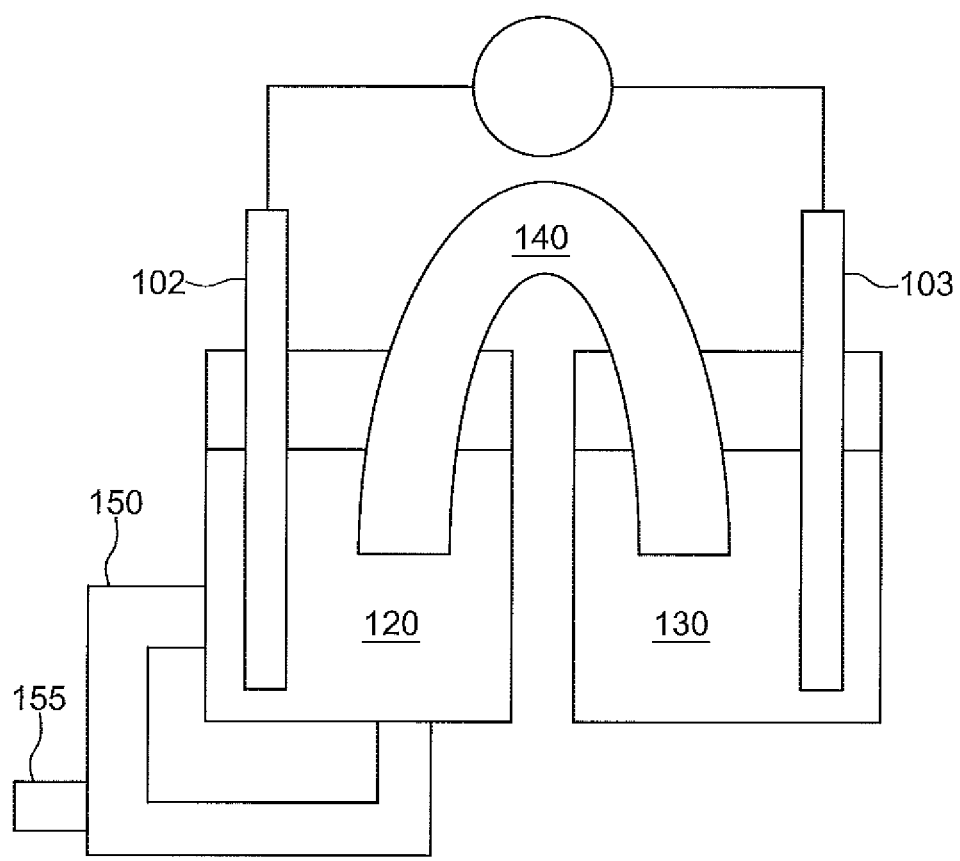
FIG. 18 is a schematic illustration of one embodiment of an electrochemical cell.

Another exemplary electrochemical cell 200 is shown in FIG. 18. The electrochemical cell 200 may be an electrochlorination cell. The electrochemical cell 200 includes a first chamber 120, an anode 102 disposed within the first chamber 120, a second chamber 130 a cathode 103 disposed within the second chamber 130, and an ionic connection 140. Each of the first chamber and the second chamber may have an inlet and an outlet. The first chamber and the second chamber may be positioned remote from each other. In some embodiments, the first chamber and the second chamber are disposed within a housing. In other embodiments, the first chamber and the second chamber are disposed within respective housings, separate from each other. Separate housings may facilitate placing the chambers remotely, for example, when the chambers are to be filled with different liquid electrolytes (for example, seawater, brine, or brackish water). The first chamber and the second chamber may be fluidically continuous or may be constructed and arranged such that their respective liquid electrolytes do not mix.

In some embodiments, the ionic connection is constructed and arranged to selectively allow passage of ions, preventing the liquid electrolyte in the first chamber from mixing with the liquid electrolyte in the second chamber. The ionic connection may comprise, for example, a channel, a salt bridge, or an ion-permeable membrane. In some embodiments, the ion-permeable membrane is selectively permeable to monovalent ions.

In some embodiments, the liquid electrolyte of the first chamber, second chamber, or both may comprise seawater.

Typically, as the separation distance increases between electrodes, electrical resistance, which scales with increasing area and path length, becomes a primary concern in electrochemical cell design. However, in a seawater treatment system, due to the conductivity of seawater (about 5 S/m) and the high salinity of seawater (about 3-5% salinity, mostly NaCl), electrical resistance may not be such a great concern as with other electrochemical cells. In some embodiments, seawater treatment electrochlorination cells disclosed herein may have a resistance per area of the channel or membrane of less than 10.0 $\Omega/mm^2$. The resistance per area may be less than 1.0 $\Omega/mm^2$, less than 0.1 $\Omega/mm^2$, or less than 0.01 $\Omega/mm^2$. Seawater treatment electrochlorination cells disclosed herein may have a resistance per diameter of the channel or membrane of less than 1.0 $\Omega/mm$. The resistance per diameter may be less than 0.1 $\Omega/mm$, less than 0.01 $\Omega/mm$, or less than 0.001 $\Omega/mm$.

Figure 17A:
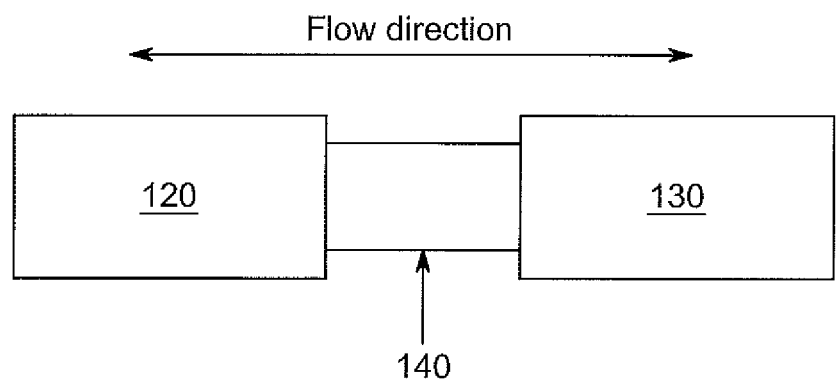
FIG. 17A is a schematic illustration of a portion of one embodiment of an electrochemical cell.

The first chamber 120 and the second chamber 130 may be arranged in series, as shown in FIG. 17A. The common flow of liquid electrolyte may occur in any direction. The channel length between the first chamber 120 and the second chamber 130 may be greater than about 5 mm, greater than about 10 mm, greater than about 50 mm, greater than about 100 mm, greater than about 500 mm, or greater than about 1,000 mm. The channel length may be at least about 20% of the length of an electrode. For instance, the channel length may be at least about 20%, 25%, 30%, 40%, 50%, 60%, 70%, 75%, 80%, 90%, or 100% of the length of an electrode. In some embodiments, the channel length may be equivalent or greater than the channel length of an electrode. The channel length may be at least 100%, 200%, 300%, 400%, or 500% of the length of an electrode.

Figure 17B:
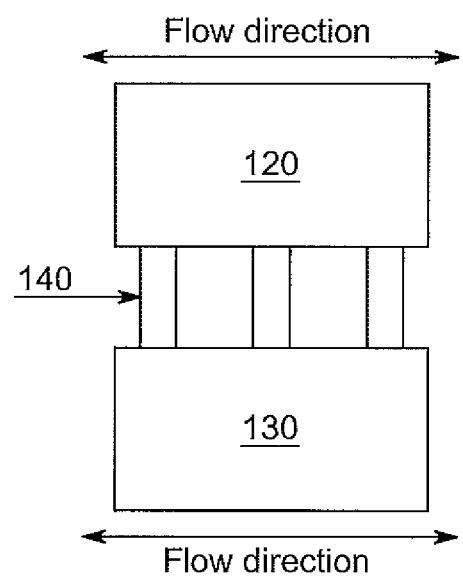
FIG. 17B is a schematic illustration of a portion of another embodiment of an electrochemical cell.

Alternatively, the first chamber 120 and the second chamber 130 may be arranged in parallel, as shown in FIGS. 17B and 15A. An inlet and outlet of each chamber may be split or merging, as shown in FIGS. 15B-15D. In particular, a shared electrolyte channel may split into a first channel fluidly connected with at least one of the inlet and the outlet of the first chamber and a second channel fluidly connected with at least one of the inlet and the outlet of the second chamber. The shared electrolyte channel may be fluidly connected to a source of aqueous solution on a first end or a point of use on the other end.

Each of the first and second chambers (120, 130) may be a single-pass chamber, such that liquid electrolyte is not recycled. In other embodiments, the electrochemical cell may include a recirculating channel 150. The recirculating channel 150 may extend between the outlet and inlet of the same chamber to recirculate liquid electrolyte. In some embodiments, the recirculating channel 150 may comprise an outlet 155 for drawing fluid from the recirculating channel 150. The outlet 155 may be used to bleed product of the recirculating stream, for example, for testing or to dilute the recirculating stream.

The first and second chamber may be in fluid communication with different sources of aqueous solution. The different sources of aqueous solution may generally have different compositions. In some embodiments, the different sources of aqueous solution may have different salinities, different conductivities, or both. For example, in a system for generating NaOCl from seawater, the second chamber (cathodic chamber) may be fed with seawater, while the first chamber is fed with brine. In such an embodiment, the ionic connection may be monovalent selective. The alternate seawater and brine configuration may prevent divalent ions from transferring to the second chamber, increasing formation of precipitates. Additionally or alternatively, the first chamber may be constructed and arranged to recirculate liquid electrolyte while the second chamber is constructed and arranged to be a single-pass chamber. In yet another configuration, an oxidant may be introduced into the second chamber to control formation of hydrogen gas. In some embodiments, a dissolved oxygen concentration may be increased in the second chamber and decreased in the first chamber.

Electrochemical cells for use in the systems and methods described herein may include concentric tube electrodes (CTE), flat electrodes (for example, disposed in a parallel plate electrochlorination (PPE) cell), spiral wound electrodes, radially arranged electrodes, or interleaved electrodes. The electrochemical cell may be a single pass or a multiple pass device. The electrodes may comprise a valve metal substrate, for example, titanium, tantalum, or niobium. The electrodes may be rigid metal electrodes. The electrodes may be formed by extrusion. The electrodes may be formed by bending of sheet metal, for example, by folding sheet metal over onto itself. The electrodes may be gas diffusion electrodes, for example, porous gas diffusion electrodes. Exemplary electrochemical cells are described in further detail in International Application Publication No. WO 2017/049052, which is incorporated herein by reference in its entirety for all purposes.

The electrodes may be mono-polar or bipolar. The electrodes may be arranged such that current flows in one pass between electrodes. Current may flow from the anode to the cathode. Alternatively, the electrodes may be arranged such that current flows in more than one pass through the device. Such a device may contain outer electrodes and inner electrodes. In some embodiments, one of the outer electrodes is coated on the inside surface to serve as an anode. The other electrode may be uncoated or coated (for example, to allow for polarity reversal). In some embodiments, the inner electrode may be a bipolar electrode, such that a portion of the outer surface of the inner electrode may be coated, and the remaining portion may be uncoated. In an exemplary embodiment, current may flow through the electrolyte from the coated outer electrode to the uncoated portion of the inner electrode, along the inner electrode to the coated portion, then finally back across the electrolyte to the uncoated outer electrode.

In some embodiments, the electrodes may be arranged such that current flows in multiple passes through the device with multiple outer electrodes and one inner electrode. By alternating coated and uncoated outer electrodes and coating the inner electrodes at matching intervals, current can flow back and forth through the electrolyte in multiple passes. In some embodiments, outer and inner electrodes are coated to allow for polarity reversal. By allowing multiple passes, the overall production rate of disinfectant (e.g., sodium hypochlorite), can be increased without a proportional increase in applied current. Increasing the electrical current would require larger wires or bus bars from the DC power supply to the electrochlorination cell, larger electrical connectors on the cell and thicker titanium for the electrodes.

For the same current, a multiple pass device may achieve a higher production rate than a single pass cell. However, the overall voltage drop may be higher for a multiple pass device, and approximately proportional to the number of passes. For the same production rate, a multiple pass cell may require lower current, approximately inversely proportional to the number of passes. Additionally, for the same power output (kW), power supply costs may be more sensitive to output current than output voltage, thereby favoring the multi-pass cells.

In some embodiment, a system may include sets of electrodes arranged in parallel. The sets of electrodes may be electrically connected in parallel, with one set connected to a positive output from a DC power supply and another set connected to the negative output. In some embodiments, the electrodes in between may be bipolar. The sets of flat electrodes may allow a higher packing density of active electrode area per unit volume of the device, when arranged such that both sides of each electrode are exposed to the electrolyte solution and therefore participate in electrode reactions. The tighter packing and multiple passes may result in a higher pressure drop.

The electrodes may be housed within a housing designed to electrically isolate the electrodes from the outside environment and to withstand the fluid pressure of electrolyte passing through the electrochemical cell. The housing may be a cylindrical or substantially cylindrical vessel. The housing may be non-conductive, chemically non-reactive to electrolyte solutions, and may have sufficient strength to withstand system pressures. For example, the housing may be designed to withstand up to 10 bar gauge or up to 16 bar gauge to be compatible with the injection of oxidant under pressure, as may be required. In some embodiments, a solid core, central core element, or fluid flow director that prevents fluid from flowing down the center and bypassing the gap between electrodes may be provided. Spacers may be provided between the anode and cathode to maintain a fixed separation. A central gas conduit may be provided for oxygen delivery so that the oxygen may combine with hydrogen produced by, for example, electrochlorination reactions in the cell to produce water. Fluid, for example, electrolyte undergoing treatment in the cell may flow through the fluid channels in the housing. For example, fluid may be directed in a direction parallel, or at least substantially parallel, to a central longitudinal axis of the electrochemical cell.

In embodiments disclosed herein including multiple anode or cathode electrodes, the multiple anode electrodes may be referred to collectively as the anode or the anode tube, and the multiple cathode electrodes may be referred to collectively as the cathode or the cathode tube. In embodiments including multiple anode and/or multiple cathode electrodes, the multiple anode electrodes and/or multiple cathode electrodes may be collectively referred to herein as an anode-cathode pair.

Electrical connection may be made between electrode pairs by one or more conductive bridges, which may be formed of the same material as the electrodes, for example, titanium. The electrochemical cell may include a plurality of anodes separated from cathodes by fluid channels. Electrochemical and chemical reactions occur at the surfaces of the electrodes and in the bulk solution to generate a product solution, for example, sodium hypochlorite for disinfection.

Electrochemical cells including spiral wound, concentric, radially arranged, and interleaved electrodes are described in further detail in International Application Publication No. WO 2016/133985, which is incorporated herein by reference in its entirety for all purposes.

In accordance with certain aspects, there is provided an electrochemical system. The electrochemical system may be an electrochlorination system or any other electrochemical system capable of either generating electrical energy from chemical reactions or facilitating chemical reactions through the introduction of electrical energy. The electrochemical system may include an electrochemical cell, a source of an aqueous solution, one or more sensors, and a controller.

Figure 3:
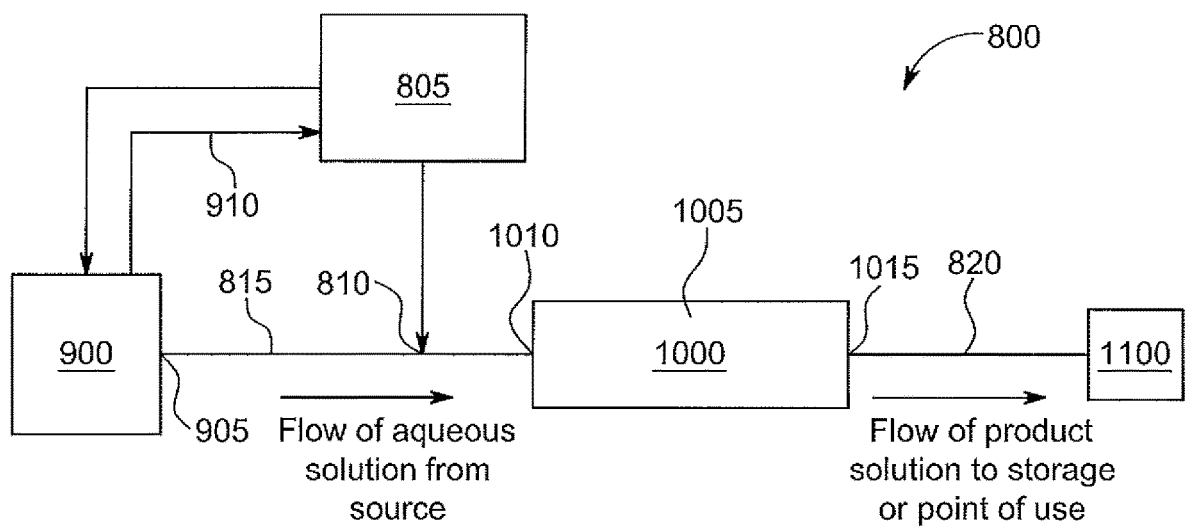
FIG. 3 is a schematic illustration of a portion of an embodiment of an electrochemical system.

One exemplary embodiment of an electrochemical system is illustrated in FIG. 3, indicated generally at 800. In FIG. 3, element 1000 represents an electrochemical cell for the production of a product compound from an aqueous solution. In some embodiments, the product compound comprises a chlorine-based compound, for example, a disinfectant. The product compound may comprise hydrogen peroxide. In some embodiments, the aqueous solution comprises a chloride-containing aqueous solution. The aqueous solution may comprise a water to be treated, for example a saline aqueous solution such as seawater, brine, or brackish water.

Electrochemical cell 1000 may be similar to any of the embodiments of electrochemical cells disclosed above. Housing 1005 of the electrochemical cell 1000 includes an inlet 1010 and an outlet 1015. An anode-cathode pair as described above with reference to the various disclosed electrochemical cells is disposed within the housing 1005. A source of aqueous solution 900 includes an outlet 905 that is fluidly connectable (and in operation, fluidly connected) to the inlet 1010 of the electrochemical cell 1000.

A source of an oxidizing agent 805 is fluidly connectable (and in operation, fluidly connected) to the source of aqueous solution 900 upstream of the inlet 1010 of the electrochemical cell 1000. The source of oxidizing agent 805 may be fluidly connectable to or connected to the source of aqueous solution 900 directly, or may be fluidly connectable to or connected to an injection point 810 in a conduit 815 fluidly connectable or connected between the source of aqueous solution 900 and the inlet 1010 of the electrochemical cell 1000. The outlet 1015 of the electrochemical cell 1000 is fluidly connectable (and in operation, fluidly connected) to a storage tank or point of use 1100, for example, via conduit 820.

Various pumps may be included in the portion of the system 800 to cause flow of the various aqueous solutions involved, but are not illustrated for the purpose of clarity. Various sensors that may measure various operating parameters of the portion of the system 800 and the various aqueous solutions involved may also be present, but are omitted from FIG. 3 for the purpose of clarity.

In operation, an aqueous solution may flow from the source of the aqueous solution 900 through conduit 815 and into the inlet 1010 of the electrochemical cell 1000. An oxidizing agent from the source of oxidizing agent 805 may be introduced into the aqueous solution. The oxidizing agent from the source of oxidizing agent 805 may be introduced directly into the source of the aqueous solution 900 and/or into conduit 815 upstream of the electrochemical cell 1000 where it mixes with the aqueous solution flowing to the electrochemical cell 1000. In the electrochemical cell 1000 a product solution is generated from the aqueous solution. The product solution flows out of the electrochemical cell 1000 through the outlet 1015 and through conduit 820 to the storage tank or point of use 1100.

Figure 4:
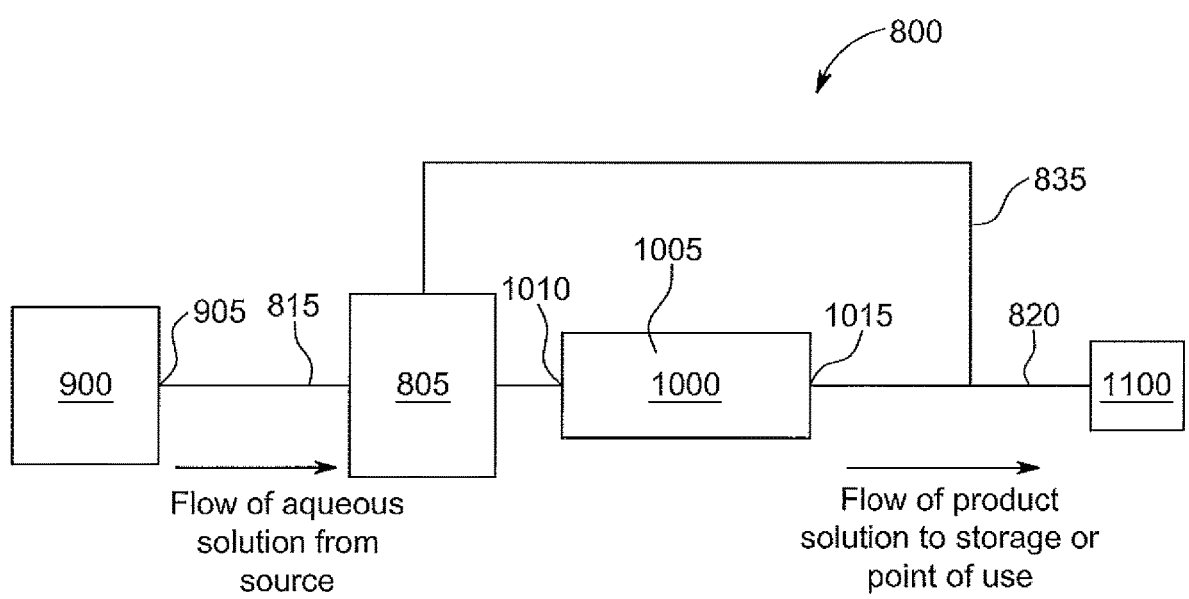
FIG. 4 is a schematic illustration of a portion of another embodiment of an electrochemical system.

The source of oxidizing agent 805 may include a system for mixing a gaseous oxidizing agent, for example, air or pure oxygen into an aqueous solution, for example, water or the aqueous solution. The source of oxidizing agent 805 may receive aqueous solution to which the oxidizing agent is to be added from the source of the aqueous solution 900, for example, via conduit 910 or via a branch from conduit 815. The source of oxidizing agent 805 may include, for example, a dissolved air flotation pump, a fine bubble tubular diffuser, an aeration vessel, a mixing vessel, a venturi, or another form of oxygenation system configured to mix the oxidizing agent with the aqueous solution upstream of the electrochemical cell. In some embodiments, as illustrated in FIG. 4, the source of oxidizing agent 805 may be inline in conduit 815. In some embodiments, the source of an oxidizing agent may include a conduit 835 arranged to recirculate a product of the electrochemical cell 1000 as an oxidizing agent.

Figure 5:
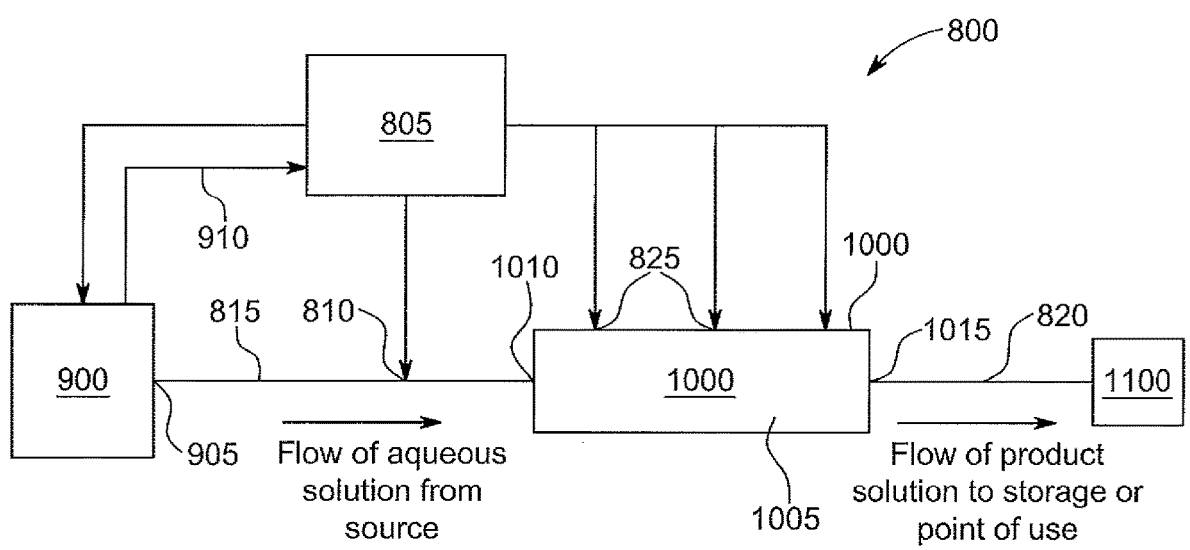
FIG. 5 is a schematic illustration of a portion of another embodiment of an electrochemical system.

In another embodiment, the electrochemical cell 1000 further includes one or more oxidizing agent injection points 825 in the housing 1005 between the inlet 1010 and the outlet 1015, as illustrated in FIG. 5. The oxidizing agent injection points 825 may be substantially evenly spaced along a length of the housing 1005. These additional oxidizing agent injection points 825 may provide for introduction of additional oxidizing agent into the electrochemical cell 1000 only to the extent desired and where desired. For example, if the oxidizing agent includes a gas such as air or oxygen, it may be undesirable to introduce too much oxidizing agent into the inlet 1010 of the electrochemical cell 1000 because it might come out of solution as gas bubbles and shield portions of the anode or cathode in the electrochemical cell 1000, reducing the electrode area available for generating the product.

The inclusion of multiple oxidizing agent injection points 825 may provide for introduction of a lesser amount of oxidizing agent at the inlet 1010 than might be desired to react with hydrogen throughout the length electrochemical cell. Additional oxidizing agent may be introduced at the additional oxidizing agent injection points 825 to make up for the loss of oxidizing agent that was introduced through the inlet 1010 via reaction with hydrogen in the electrochemical cell 1000. The use of multiple oxidizing agent injection points 825 in the housing 1005 may facilitate maintaining a substantially even concentration of oxidizing agent along the length of the electrochemical cell 1000. The use of multiple oxidizing agent injection points 825 in the housing 1005 may facilitate delivery of oxidizing agent to desired areas in the electrochemical cell 1000 that oxidizing agent introduced through the inlet 1010 might not reach due to, for example, low turbulence and a small amount of mixing or a low Reynolds number for fluid flow within the electrochemical cell 1000.

The point of use 1100 may include a shipboard system, a drilling platform system, an aquatics system (for example, a swimming pool or a fountain), a drinking water system, or a downhole of an oil drilling system. The point of use 1100 may include a cooling water system of a ship or sea based platform or a ballast tank of a ship.

Figure 6:
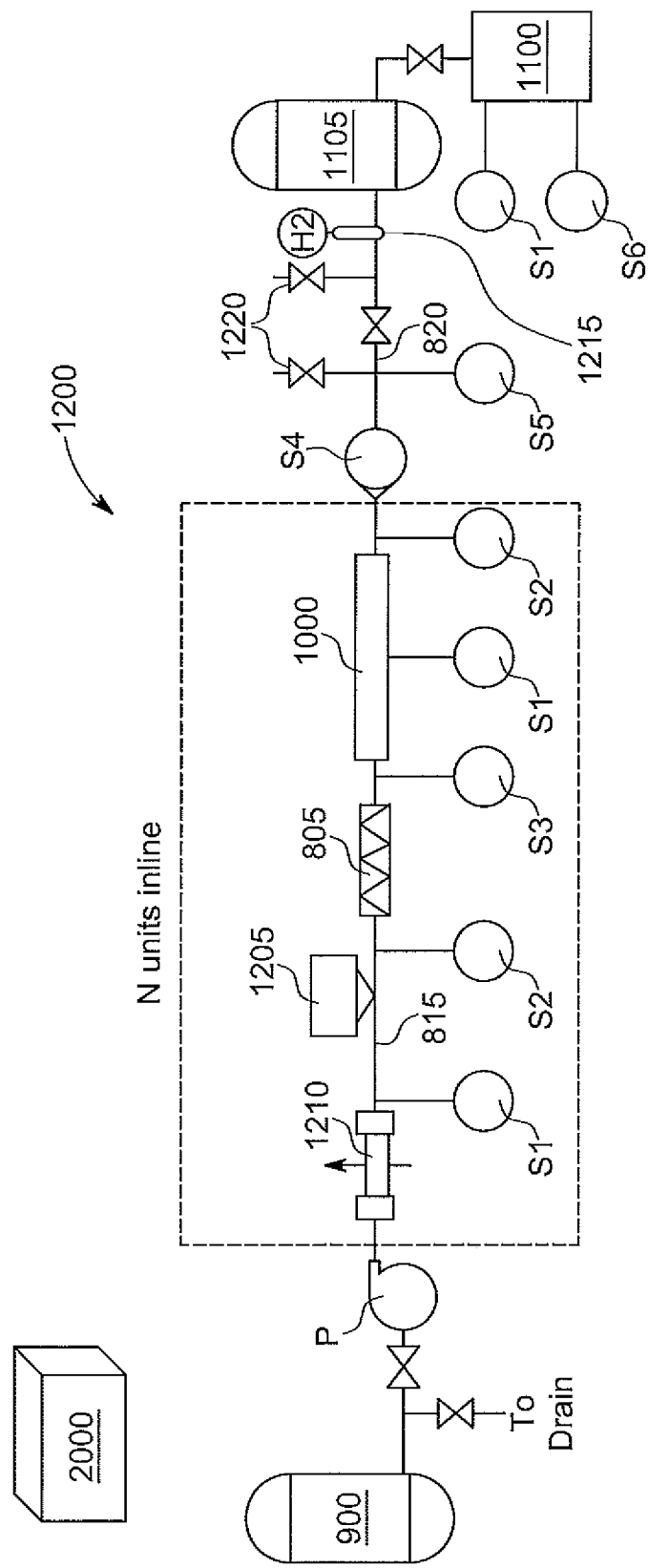
FIG. 6 is a schematic illustration of an embodiment of an electrochemical system.

Another embodiment of an exemplary electrochemical system is illustrated in FIG. 6, indicated generally at 1200. System 1200 includes an electrochemical cell 1000 that may be similar to any of the embodiments of electrochemical cells disclosed above. A source of oxidizing agent or oxidizing system 805 may be disposed in conduit 815 upstream of the electrochemical cell 1000. The source of aqueous solution 900 is illustrated as a tank. The point of use 1100 may be disposed downstream of the electrochemical cell 1000. A holding or storage tank 1105 may be disposed between the electrochemical cell 1000 and the point of use 1100 and may be connected to the point of use 1100 by a valve (unlabeled) that may be opened, closed, or adjusted to dose the point of use 1100 with desired amounts of product generated in the electrochemical cell 1000.

Various pumps may control the flow of fluid through the system. One or more sensors may monitor one or more parameters of fluid flowing through the system, for example, of aqueous solution to be introduced to an electrochemical cell in the one or more electrochemical systems, fluid internal to the electrochemical cell, liquid in the point of use, or of product solution produced or generated in the electrochemical cell. These parameters may include, for example, flow rate, ionic concentration, chlorine concentration, oxygen concentration, hydrogen concentration, pH, electrical parameters, temperature, oxygen reduction potential (ORP), or any other parameters of interest. Additional sensors may monitor parameters of the electrochemical cell itself, for example, current and/or voltage across an anode-cathode pair in the electrochemical cell, temperature of or within the electrochemical cell, or flow rate of electrolyte through the electrochemical cell.

The pumps and sensors may be in communication with a control system or controller which communicates with the sensors and pumps and controls operation of the pumps and other elements of the system to achieve desired operating parameters.

Various operating parameters of the electrochemical systems disclosed herein may be controlled or adjusted by an associated control system or controller based on various parameters measured by various sensors located in different portions of the electrochemical systems. The controller may be programmed or configured to regulate introduction of oxidizing agent into aqueous solution to be introduced to the electrochemical cell of a system based at least on one or more of a flow rate of the aqueous solution, a concentration of chloride in the aqueous solution, or an oxidation-reduction potential of a liquid in a point of use for a product solution generated in the electrochemical cell. The controller may be programmed or configured to regulate introduction of the oxidizing agent into the aqueous solution based at least on a concentration of a product compound generated in the electrochemical cell. The controller may be further configured to regulate the concentration of the product compound generated in the electrochemical cell based at least on an oxidation-reduction potential of liquid in a point of use fluidly connectable to the outlet of the housing of the electrochemical cell. In some embodiments, the controller may be configured to introduce the oxidizing agent into aqueous solution in an amount sufficient to prevent formation of hydrogen gas during operation of the electrochemical cell.

The controller may be programmed or configured to regulate introduction of the oxidizing agent into the aqueous solution or introduction of the aqueous solution into the electrochemical cell based at least on one or more of temperature in the electrochemical cell, pH of the aqueous solution, pH of a product solution generated in the electrochemical cell, flow rate of the aqueous or product solution, ORP of the aqueous or product solution, or current or voltage applied across the anode and the cathode. The controller may be programmed or configured to regulate introduction of the oxidizing agent into the aqueous solution or introduction of the aqueous solution into the electrochemical cell based at least on one or more of an amount of gaseous hydrogen present in the electrochemical cell, a concentration of hydrogen dissolved the aqueous solution, a concentration of oxygen dissolved in the aqueous solution, or a concentration of oxygen dissolved in a product solution generated in the electrochemical cell.

The controller may be programmed or configured to regulate a current across the anode-cathode pair based on a flow rate of the aqueous solution or a rate of introduction of the oxidizing agent into the aqueous solution. The controller may be programmed or configured to reverse polarity of the anode and the cathode to reduce, prevent, or suppress hydrogen gas generation in the electrochemical cell. For example, the controller may be programmed or configured to reverse polarity of the electrodes responsive to the voltage measured across the anode-cathode pair or the dissolved hydrogen concentration exceeding a predetermined threshold. In some embodiments, the controller may be programmed or configured to reverse polarity of the anode and the cathode to prevent generation of hydrogen gas in the electrochemical cell.

The controller may be programmed or configured to cause current to be applied in a pulsed waveform as disclosed herein. The controller may be configured to change, alter, or regulate the current applied by the electrodes. In some embodiments, the controller is configured to regulate a duration of pulses of the current. The controller may additionally or alternatively regulate a rate of incidence of pulsed current. The duration of pulses and/or the rate of incidence may occur on regular or irregular intervals (for example, as needed or as determined necessary by a sensor). The controller may regulate a voltage applied across the anode and the cathode. The controller may be programmed or configured to regulate the applied current, applied voltage, or pulsed waveform responsive to a flowrate of the aqueous solution into the electrochemical cell, a voltage measured across the anode and the cathode, or hydrogen gas concentration in the product solution. The controller may be programmed or configured to regulate the applied current, applied voltage, polarity of the electrodes, or pulsed waveform responsive to a flow rate, a pH measurement, a temperature measurement, or an oxidation-reduction potential of at least one process solution. The controller may be programmed or configured to regulate the applied current, applied voltage, polarity of the electrodes, or pulsed waveform responsive to a dissolved oxygen concentration or dissolved hydrogen concentration of at least one process solution.

In some embodiments, the controller may be programmed or configured to apply current in a pulsed waveform to reduce, prevent, or suppress generation or accumulation of hydrogen gas. For example, the controller may be programmed or configured to apply current in a pulsed waveform responsive to a hydrogen gas concentration exceeding a predetermined threshold sufficient to cause generation of hydrogen gas during operation of the electrochemical cell. In some embodiments, the controller may be programmed or configured to apply current in a pulsed waveform to suppress substantially all hydrogen gas accumulation within the electrochemical cell.

The controller may be programmed or configured to regulate the applied current, applied voltage, polarity of the electrodes, or pulsed waveform sufficient to prevent generation of hydrogen gas within the electrochemical cell. The applied current, applied voltage, polarity of the electrodes, or pulsed waveform may be dependent on, for example, flow conditions or turbulence within the electrochemical cell, diffusivity of oxygen within the electrochemical cell, operating current, cathode area, etc.

In some embodiments, the controller may be programmed or configured to regulate one or more conditions of the aqueous solution in an amount sufficient to prevent generation of hydrogen gas within the electrochemical cell. The controller may be programmed or configured to regulate a flow rate or composition of the aqueous solution, such that the available oxidant is provided in an amount approximately stoichiometric with a quantity of product compound produced in the electrochemical cell. The regulation of aqueous solution may be dependent on, for example, flow conditions or turbulence within the electrochemical cell, diffusivity of oxygen within the electrochemical cell, operating current, cathode area, etc. The composition of the aqueous solution may be regulated by dosing with one or more compounds, for example, a pH balancing agent or an oxidant.

In some embodiments, the controller may additionally be programmed or configured to introduce the oxidizing agent into the aqueous solution in an amount sufficient to prevent generation of hydrogen gas within the electrochemical cell. The controller may be programmed or configured to introduce the oxidizing agent into the aqueous solution in an amount approximately stoichiometric with a quantity of product compound produced in the electrochemical cell, and potentially overdose the oxidizing agent above the stoichiometric amount, for example, to provide sufficient oxidizing agent availability at the cathode(s) of the electrochemical cell such that hydrogen is not generated at the cathode(s) during operation. The amount of oxygen overdosing may be dependent on, for example, flow conditions or turbulence within the electrochemical cell, diffusivity of oxygen within the electrochemical cell, operating current, cathode area, etc. The controller may be programmed or configured to introduce the oxidizing agent into the aqueous solution in an amount sufficient to provide for substantially all free hydrogen in the electrochemical cell to be oxidized.

In general, the controller may be programed to make any change to limit or prevent generation of hydrogen gas. In an IV-curve, a change in voltage may indicate generation of hydrogen gas. Thus, the controller may be enabled to control conditions that maintain the voltage indicative of hydrogen gas production (or predetermined threshold voltage) below the limit that may indicate generation of hydrogen gas. Because hydrogen gas generation is generally dependent on conditions such as temperature, pH, ORP, dissolved oxygen concentration, and dissolved hydrogen concentration, any one or more of these parameters may be controlled to be maintained within a predetermined range that indicates limited or no production of hydrogen gas within the system.

The controller for monitoring and controlling operation of the various elements of system may include a computerized control system. The output devices configured to act in response to instructions from the controller may comprise valves, pumps, or switches which may be utilized to introduce aqueous solution (for example, brine, brackish water, or seawater) from the source into the electrochemical system and/or to control the speed of pumps. One or more sensors may also provide input to the controller. These sensors may include, for example, sensors which may be, for example, pressure sensors, chemical concentration sensors, temperature sensors, or sensors for any other parameters of interest to system. These sensors may be located in any portion of the system where they would be useful, for example, upstream of point of use in fluid communication with a product solution, within the electrochemical cell or in fluid communication with a solution proximate the anode or the cathode, and/or upstream of an inlet of the electrochemical cell in fluid communication with the source of aqueous solution. In addition, the controller may contain one or more interfaces (not shown) that connect the controller to a communication network in addition or as an alternative to the disclosed interconnection mechanisms.

Referring again to the exemplary system shown in FIG. 6, system 1200 may include multiple sensors S1-S6 that may feed data to a control system or controller 2000 which may adjust operating parameters of components of the system 1200 based on the data from the sensors.

The sensors may include a sensor for measuring hydrogen gas concentration. The sensor for measuring hydrogen gas may be in fluid communication with the product solution. For example, the sensor may be downstream of a cathode, where hydrogen gas tends to be generated. The sensor may be provided to determine when the hydrogen gas has accumulated to a threshold concentration which is dangerous. The sensor for measuring hydrogen gas concentration may be used to provide data to the controller which may be used to reverse polarity of the electrodes, modify applied current or voltage (for example, apply a pulsed waveform), or modify a rate of introduction of aqueous solution or oxidant in response to the divalent hardness concentration exceeding a predetermined threshold.

The sensors may include a temperature sensor S1 downstream of the heat exchanger 1210 which may provide feedback for control of the heat exchanger, a temperature sensor S1 in or on the electrochemical cell 1000 which may be used to provide data that the controller may use to reverse polarity of the anode and the cathode, modify or apply current in a pulsed waveform, adjust a rate of introduction of the aqueous solution into the electrochemical cell, adjust dosages of oxidizing agent into the aqueous solution, or any other action that may be taken in response to a temperature measurement. The system may additionally or alternatively include a temperature sensor S1 in or on the point of use 1100 which may provide feedback to the controller that may be used to determine when and how much product should be dosed into the point of use 1100.

In some embodiments, pH sensors S2 may be provided upstream and/or downstream of the electrochemical cell 1000 and may provide feedback to the controller that may be used to adjust operation of the pH adjustment system 1205 to keep the pH of the aqueous solution entering the electrochemical cell 1000 and/or product solution exiting the electrochemical cell 1000 within desired ranges. For example, the pH adjustment system 1205 may be operated to keep the pH of the aqueous solution entering the electrochemical cell 1000 between about 4 and about 10. A pH sensor S2 may be used to provide data that the controller may use to reverse polarity of the anode and the cathode, modify or apply current in a pulsed waveform, adjust a rate of introduction of the aqueous solution into the electrochemical cell, adjust dosages of oxidizing agent into the aqueous solution, or any other action that may be taken in response to a pH measurement.

System 1200 may include a pH adjustment system 1205 including a source of pH adjuster, for example, a mineral acid or a caustic such as NaOH and a heat exchanger 1210. The pH adjustment system 1205 may adjust the pH of the aqueous solution to a pH rendering reactions for generation of a desired species of product in the electrochemical cell 1000 favorable, to a pH high enough such that the formation of hydrogen gas in the electrochemical cell 1000 is suppressed, and/or to a pH low enough such that precipitation of magnesium from the aqueous solution in the electrochemical cell 1000 is suppressed. The pH adjustment system 1205 may adjust the pH of the aqueous solution to a pH of, for example, between about 2 and about 14 or between about 7 and about 10. The heat exchanger may be used to adjust the temperature of the aqueous solution to a temperature that results in desired reaction kinetics in the electrochemical cell 1000 and/or to adjust the solubility of oxygen or hydrogen in the aqueous solution.

A dissolved oxygen sensor S3 may be used to measure dissolved oxygen levels in the aqueous solution. A dissolved hydrogen sensor S3 may be used to measure dissolved hydrogen levels in the aqueous solution. A dissolved oxygen or hydrogen sensor may measure oxygen or hydrogen at an electrode of the system or in the product solution. The controller may utilize an indication of the dissolved oxygen or hydrogen level in the aqueous solution to control the source of oxidizing agent or oxidizing system 805 to maintain the dissolved oxygen level in the aqueous solution to be introduced in to the electrochemical cell within a desired range. The controller may utilize an indication of the dissolved oxygen or hydrogen level in the product solution to control the source of oxidizing agent or oxidizing system 805 to maintain the dissolved oxygen level in the aqueous solution to be introduced in to the electrochemical cell within a desired range.

A flow sensor S4 may provide product solution flow rate data to the controller which may use this data to control operation of pump P, the source of oxidizing agent or oxidizing system 805, and/or current or voltage applied across the anode-cathode pair of the electrochemical cell 1000. In some embodiments, a flow sensor may provide aqueous solution flow rate data to the controller.

An electrical meter S5, for example, a potentiostat may be utilized to measure electrical parameters and/or generate a current-voltage curve of the aqueous solution or product solution, which may be utilized to gain information about whether the electrochemical cell is operating in a desired range. In some embodiments, the desired range is one in which a divalent hardness concentration falls below a predetermined threshold such that no hydrogen gas is generated within the electrochemical cell. In some embodiments, the desired range is one in which substantially all hydrogen in the electrochemical cell is being reacted with oxygen supplied in the aqueous solution. Data from the electrical meter S5 may be used by the controller to control operation of pump P (i.e., a rate of introduction of the aqueous solution into the electrochemical cell), the source of oxidizing agent or oxidizing system 805, and/or current or voltage applied across the anode-cathode pair of the electrochemical cell 1000. Data from the electrical meter S5 may be used by the controller to reverse polarity of the anode and the cathode or modify or apply current in a pulsed waveform.

An oxidation reduction potential (ORP) meter S6 may be provided to obtain readings of ORP of liquid in the point of use 1100 which may be used by the controller to determine when and how much product solution be dosed into the point of use 1100. In some embodiments, an oxidation reduction potential (ORP) meter may be provided to obtain readings of ORP of the product solution which may be used by the controller to regulate a rate of introduction of the aqueous solution into the electrochemical cell.

System 1200 may further include a gas separation column 1215 that may be used to remove residual hydrogen from the product solution. A breakout loop 1220 may be provided to allow for sampling of the product solution and/or addition of additional or alternate sensors, for example, sensors for measuring chlorine, oxygen, or hydrogen levels in the product solution.

Various components of the system 1200 may be serially repeated in line with one another. For example, system 1200 may have multiple repeated subsystems including a heat exchange 1210, pH adjustment system 1205, source of oxidizing agent or oxidizing system 805, electrochemical cell 1000, and possibly pump P arranged serially in line with one another.

Figure 7:
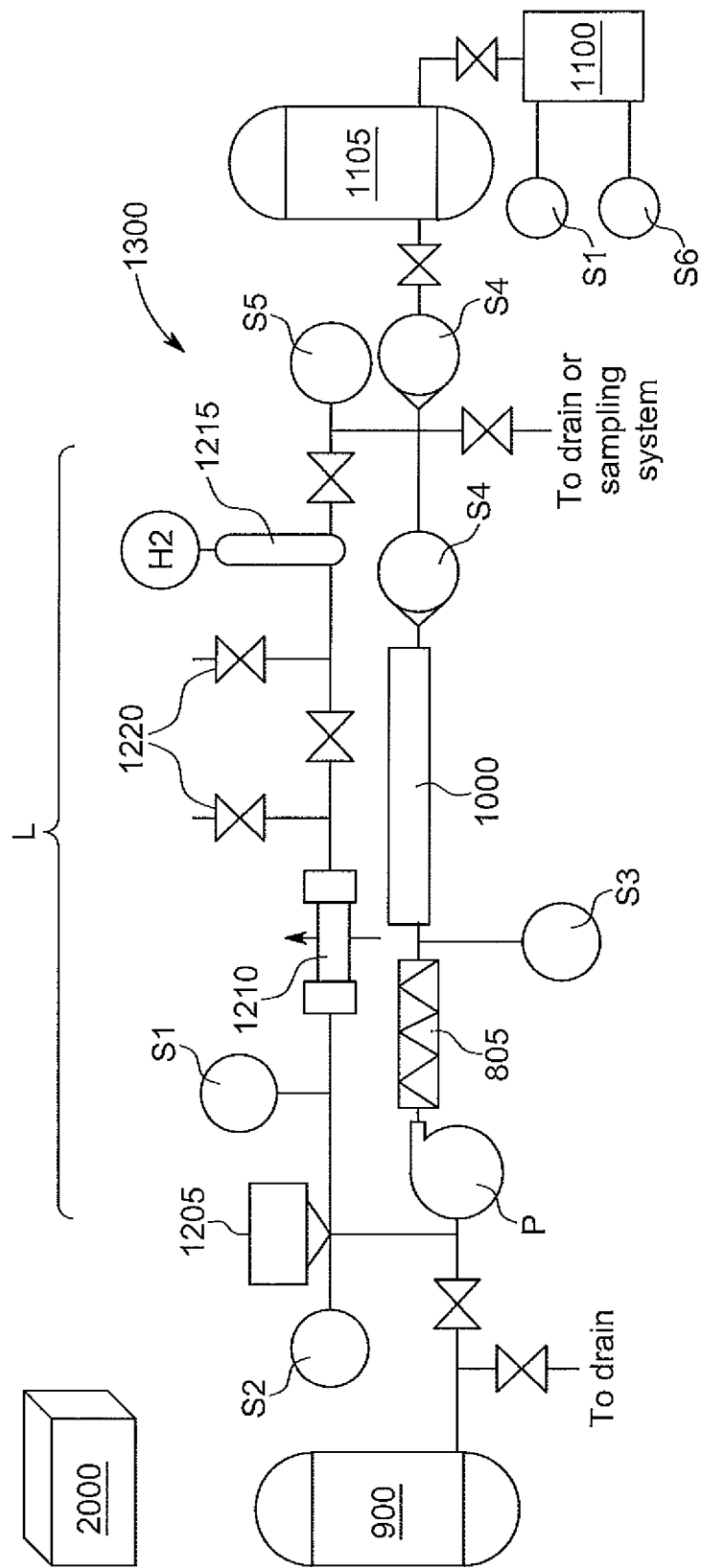
FIG. 7 is a schematic illustration of another embodiment of an electrochemical system.

Another embodiment of an electrochemical system is indicated generally at 1300 in FIG. 7. System 1300 includes similar components as system 1200 of FIG. 6 which are labelled with identical indicators. System 1300 differs from system 1200 in that system 1300 is a "feed & bleed" system whereas system 1200 is a "once through" type of system. In system 1300 product solution generated by electrochemical cell 1000 circulates around loop L until it is desired to output some product solution to storage tank 1105 and/or point of use 1100. As or after product solution is removed from loop L, additional aqueous solution may be introduced to loop L from the source of aqueous solution 900.

Electrochemical or electrochlorination cells and devices as disclosed herein may be included as part of a larger system. In some embodiments, the system is a sea-based system, for example, a ship or an oil rig, and in other embodiments is a land based building, for example, a power plant, an oil drilling facility or system or other industrial facility. In other embodiments, the system is or may include a swimming pool, or a treatment system for drinking water, wastewater, or industrial water treatment processes, that uses one or more products of electrochemical devices in the system, for example, a disinfectant to treat or disinfect water.

Such a system may draw process liquid or electrolyte, which in some embodiments is seawater, brackish water, or brine, from sources external and/or internal to the system. For example, if the system is a sea-based system, an external source may be the ocean and an internal source may be, for example, a ballast tank in a ship. In land based system, an external source may be the ocean and an internal source may be brackish wastewater from an industrial process performed in the system.

The one or more electrochemical systems may produce product solution, for example, chlorinated water and/or a solution including sodium hypochlorite from the aqueous solution and distribute it to a point of use. The point of use may be a source of cooling water for the system, a source of disinfection agent for a ballast tank of a ship, a downhole of an oil drilling system, or any other system in which a chlorine-based disinfection solution may be useful.

EXAMPLES

The function and advantages of the embodiments discussed above and other embodiments of the invention can be further understood from the examples below, which further illustrate the benefits and/or advantages of the one or more systems and techniques of the invention but do not exemplify the full scope of the invention.

Example 1: Change in Applied Voltage Over Time

An electrochemical cell was run as disclosed herein. Specifically, a DC current was applied to a 3.5% NaCl solution saturated at 100 psi with oxygen gas. As shown in FIG. 1, the voltage increased to 1.6 volts within 500 seconds. Hydrogen gas was detected as it was generated from the solution.

As shown in FIG. 1, the cathodic potential is limited to within −1.5 volts if the DC current is applied as a pulse with a duration of 200 seconds or less. At 100 seconds or less, the voltage is limited below −1.3 volts. At 50 seconds or less the voltage is limited below −1.0 volts.

Thus, the current can be applied in limited pulses, making it possible to run the electrochemical cell with less potential. The pulsed waveform enables generation of a product compound while limiting hydrogen gas generation.

Example 2: Hydrogen Generation

Figure 9:
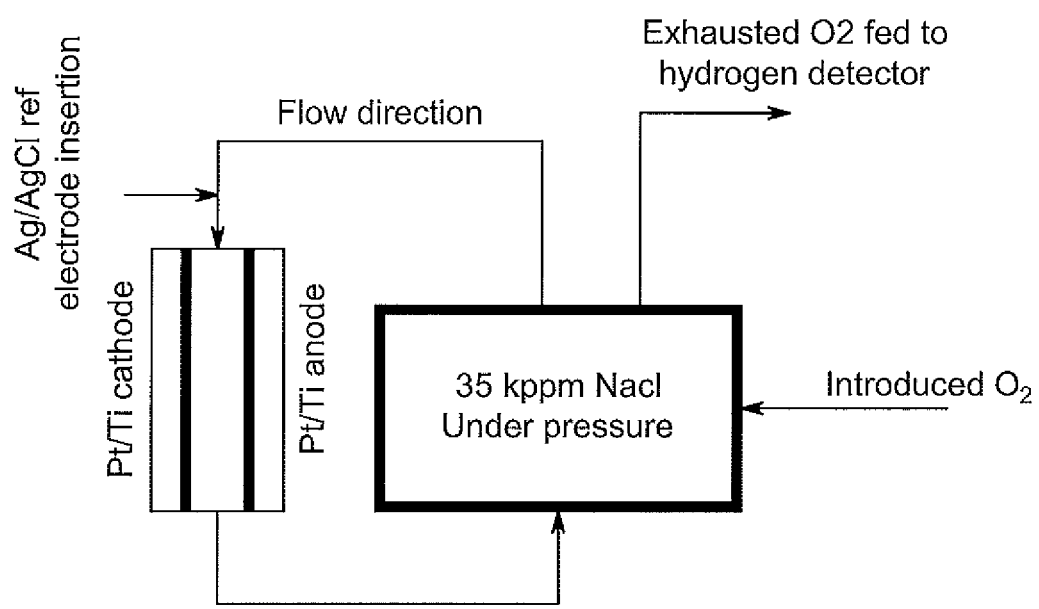
FIG. 9 is a schematic illustration of an experimental electrochemical cell used to obtain test data.

An electrochemical cell was run as disclosed herein. A schematic illustration of an exemplary experimental electrochemical cell is shown in FIG. 9. The electrochemical cell included an anode-cathode pair made of Pt plated Ti mesh. A reference electrode made of Ag/AgCl was provided in the flow line to collect electric potential data. A 3.5% w/w NaCl and water solution pressurized at 95 psi oxygen gas was pumped through the electrochemical cell at a linear velocity of about 2 m/s.

After about 500 seconds, hydrogen gas was detected in the exhaust line. The onset of hydrogen generation occurred at about −1.6 volts potential across the anode-cathode pair. Under similar conditions, current may be applied for less than 500 seconds to limit hydrogen generation within an electrochemical cell.

Example 3: Reversed Pulse Power Supply at ±1 A (±1,000 A/m$^2$)

An electrochemical cell was run as disclosed in Example 2. The electrodes were operated by reversed pulse power supply. At negative pulse, the designated anode generates hypochlorite and a byproduct of oxygen. The anodic reactions are as follows:

| | |
|---|---|
| Cl$^-$ + 2e$^-$ → Cl$_2$ | 1.358 V |
| 4H$_2$O + 4e$^-$ → O$_2$ + 4H$^+$ | 1.229 V |

Figure 10A:
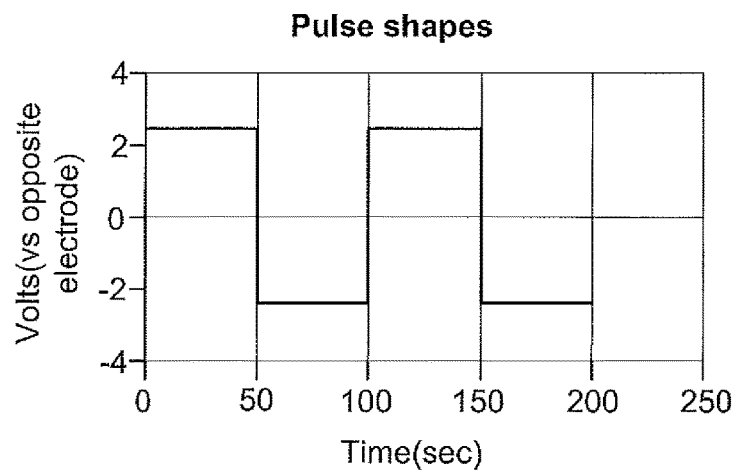
FIG. 10A is a graph of applied current over time, according to one experimental run of an exemplary electrochemical cell.

A 1 A current (1,000 A/m$^2$) in a pulsed mode was run in pulses having a duration of 50 seconds. The voltage across the electrodes of the electrochemical cell is shown in FIG. 10A. No hydrogen was detected for 18,000 seconds. The hypochlorite generation current efficiency was about 59% when a total of 160 ppm sodium hypochlorite was measured in a reservoir of 17 liters.

Figure 10B:
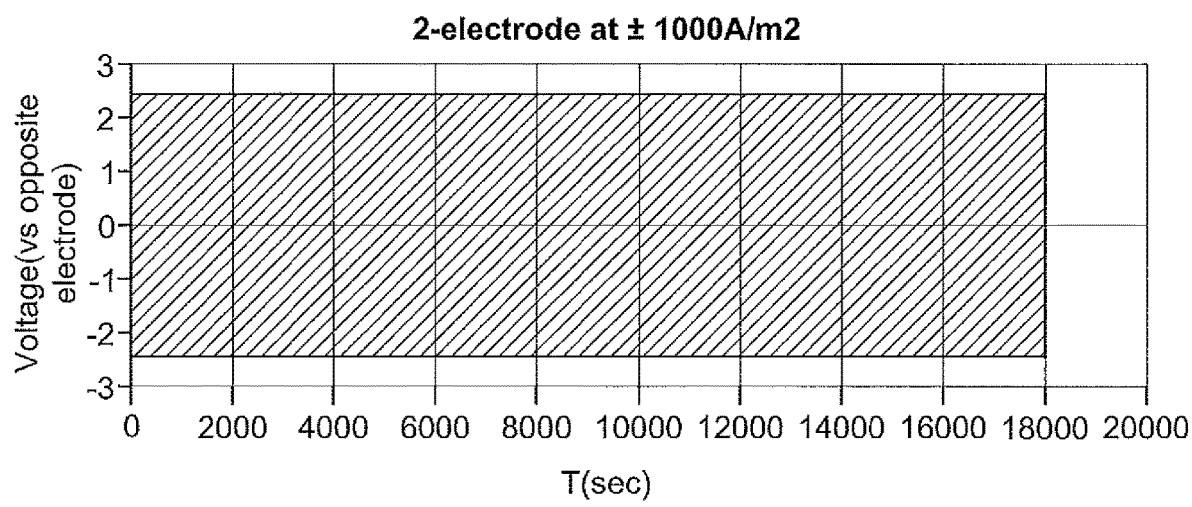
FIG. 10B is a graph of detected voltage over time, as measured during the experimental run of FIG. 10A.

The pulsed waveform allows for operating the electrochemical cell with a constant absolute value of voltage and stable potential within the electrochemical cell over time, as shown in FIG. 10B. By applying current in a pulsed waveform, the electrochemical cell can be run for extended periods of time without a resulting voltage drop and hydrogen gas production.

Example 4: Reversed Pulse Power Supply at ±1.3 A (±1,300 A/m$^2$)

Figure 11A:
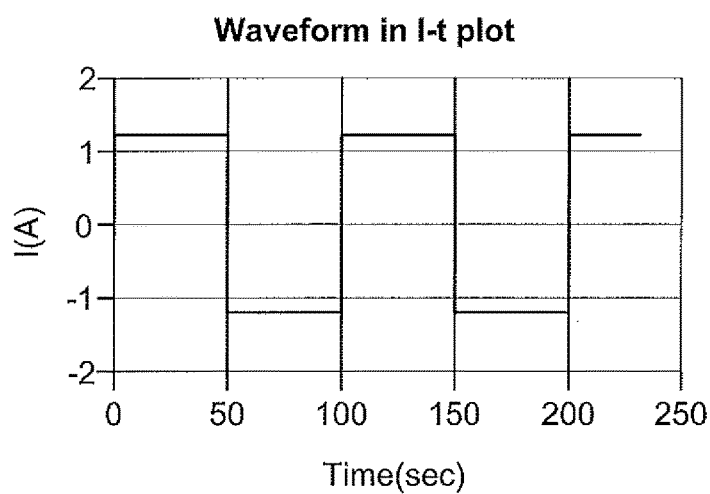
FIG. 11A is a graph of applied current over time, according to another experimental run of an exemplary electrochemical cell.
Figure 11B:
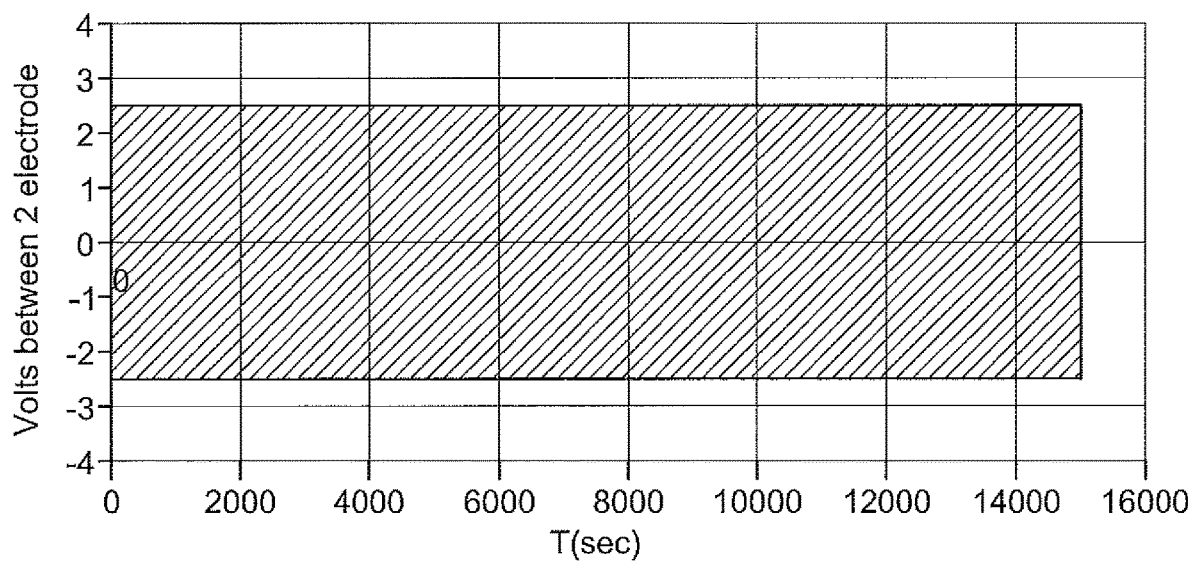
FIG. 11B is a graph of detected voltage over time, as measured during the experimental run of FIG. 11A.

An electrochemical cell was run as disclosed in Example 3. The pulsed current was applied at ±1.3 A (±1,300 A/m$^2$), as shown in FIG. 11A. No hydrogen was detected for 13,000 seconds. The total sodium hypochlorite was detected to be 220 ppm in a 17 liter reservoir. The absolute value of the voltage between the electrodes or the electrochemical cell remained constant, as shown in FIG. 11B.

Example 5: Reversed Pulse Power Supply at ±1.75 A (±1,750 A/m$^2$)

An electrochemical cell was run as disclosed in Example 3. Oxygen was pressurized at 100 psi. The pulsed current was applied at ±1.75 A (±1,750 A/m$^2$) in pulses lasting 50 seconds. Hydrogen was detected in the exhaust line at about 10-15% Lower Explosive Limit (LEL).

Figure 12:
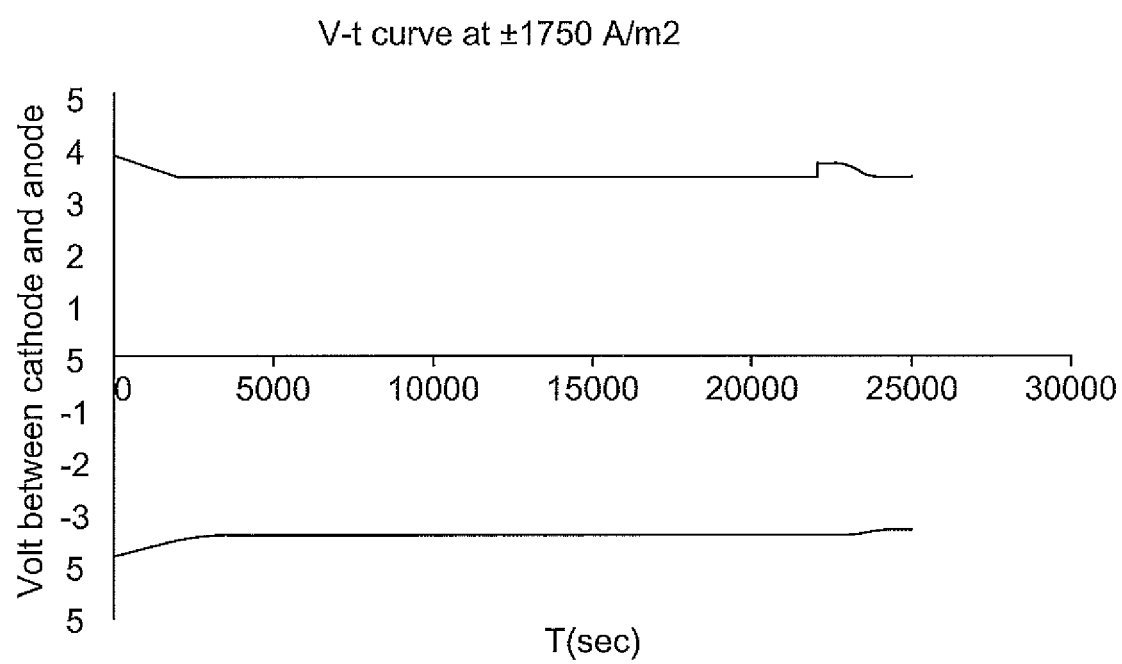
FIG. 12 is a graph of detected voltage over time, as measured during another experimental run of an exemplary electrochemical cell.

As the run progressed, the solution became saturated with oxygen. The hydrogen decreased until it reached 0% LEL at about 1,500 seconds. The voltage stabilized, as shown in FIG. 12. The hydrogen remained at 0% LEL as long as the system was pressurized with oxygen.

At about 2,200 seconds the system pressure was released and the dissolved oxygen concentration decreased significantly. The voltage increased at this point, corresponding with a detection of hydrogen generation.

Oxygen was reintroduced into the system. Hydrogen detection decreased with dissolved oxygen concentration reaching saturation.

Thus, at a current of ±1.75 A (±1750 A/m$^2$), hydrogen generation can be suppressed by introducing dissolved oxygen at saturation into an aqueous solution of NaCl introduced into an electrochemical cell as described herein.

Example 6: Hydrogen Peroxide Generation

The H$_2$O$_2$ generation reaction (+0.682V) is more energetically favorable than the H$_2$O generation reaction (+0.4V). By shifting the applied potential, it is possible to shift the reaction chemistry of the disclosed electrochemical cells to produce H$_2$O$_2$.

Electrode area is dependent upon applied current density. For a reaction of 1.57 kA/h per 1 kg (assuming a 100% Faradic efficiency), and a generation rate of 1 kg/h, an area of 0.71 m$^2$ an electrode area of can be anticipated (1.57 kA/(2.2 kA/m$^2$)).

Figure 13B:
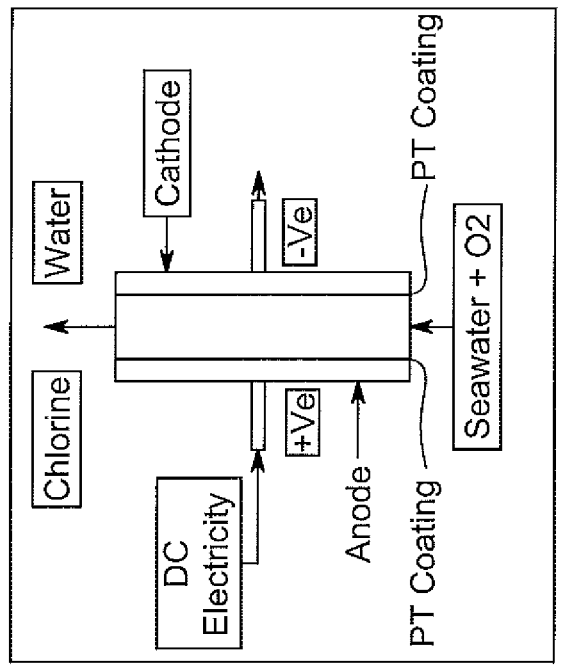
FIG. 13B is a schematic illustration of an electrochemical cell, according to one embodiment.
Figure 13A:
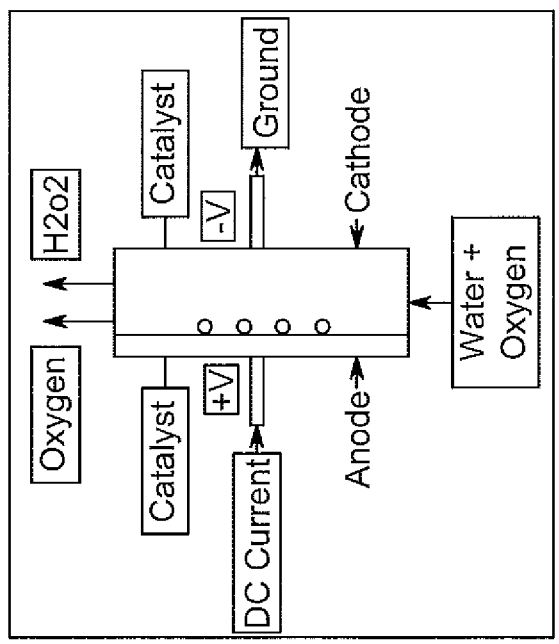
FIG. 13A is a schematic illustration of an electrochemical cell, according to one embodiment.

In the exemplary embodiment shown in FIG. 13A, water and dissolved oxygen were run through an electrochemical cell at high velocity (>2 m/s). The reaction chemistry at each electrode is as follows:

| | | |
|---|---|---|
| Anode: | 2H$_2$O → O$_2$ + 4H$^+$ + 4e$^-$ | E$^0_{OX}$ = −1.23 V (oxygen generation) |
| Cathode: | O$_2$ + 2H$^+$ + 2e$^-$ → H$_2$O$_2$ | E$^0_{RED}$ = +0.682 V (oxygen consumption) |
| | | E$^0_{CELL}$ = −0.548 V |

In the exemplary embodiment shown in FIG. 13B, seawater and dissolved oxygen were run through an electrochemical cell at high velocity (>2 m/s). The reaction chemistry at each electrode is as follows:

| | | |
|---|---|---|
| Anode: | 2Cl$^-$ → Cl$_2$ + 2e$^-$ | E$^0_{OX}$ = −1.236 V (chlorine generation) |
| Cathode: | O$_2$ + 2H$_2$O + 4e$^-$ → 4OH$^-$ | E$^0_{RED}$ = +0.40 V (oxygen consumption) |
| | | E$^0_{CELL}$ = −0.96 V |

Hydrogen peroxide can be generated from water and dissolved oxygen to mitigate hydrogen gas formation in an electrochemical cell.

Example 7: Resistance Per Unit Length

Figure 16A:
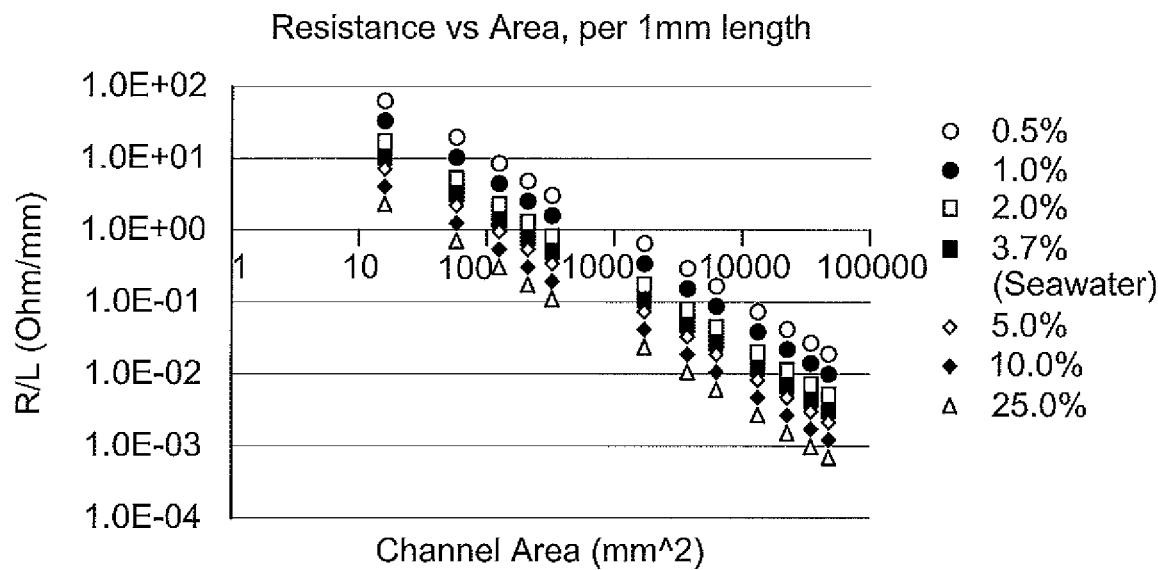
FIG. 16A is a graph of channel resistance per area in electrochemical cells running solutions of varying salinity.
Figure 16B:
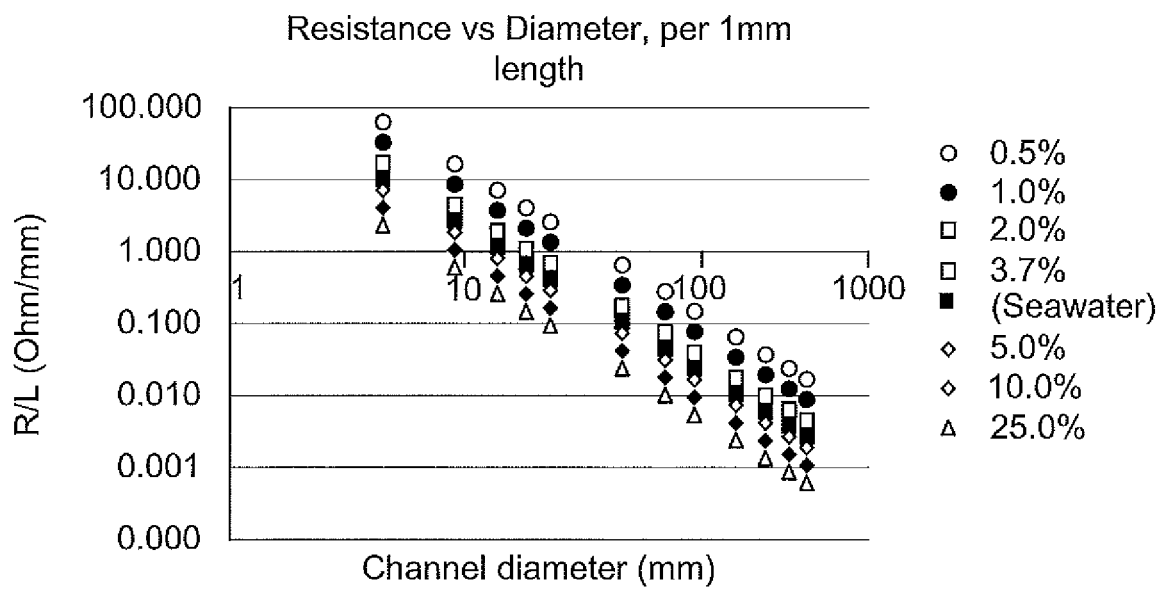
FIG. 16B is a graph of channel resistance per diameter in electrochemical cells running solutions of varying salinity.

Channel resistance per unit length in electrochemical cells having a varying channel area was calculated running a variety of aqueous solutions at standard temperature and pressure (1 ATM, 20° C.). The results are shown in the graphs of FIGS. 16A and 16B. The seawater (3.7% salinity) trendline for resistance per area (Ω/mm$^2$) is shown as the center series in FIG. 16A. The seawater (3.7% salinity) trendline for resistance per channel diameter (Ω/mm) is shown as the center series in FIG. 16B. Above the seawater series, the resistance (Ω) for aqueous solutions with less salinity (0.5%-2.0%) than seawater are plotted for increasing channel area (mm$^2$) or diameter (mm). Below the seawater series, the resistance (Ω) for aqueous solutions having a salinity (5.0%-25%) greater than seawater are plotted for increasing channel area (mm$^2$) or diameter (mm).

As shown in the graph, resistance per unit length tends to decrease with increasing salinity and increasing channel area. Electrochlorination cells disclosed herein designed for use with high salinity aqueous solution may be provided with increasing channel area, without the concern of a debilitating resistance impeding their function. Thus, electrochlorination cells having first and second chambers positioned remotely from each other may be advantageous in generating NaOCl from seawater.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

What is claimed is:

1. An electrochemical cell comprising:
a first chamber having an inlet and an outlet;
an anode disposed within the first chamber;
a second chamber having an inlet and an outlet;
a cathode disposed within the second chamber;
a controller configured to apply an electrical current across the anode and cathode and to mitigate generation of hydrogen gas within the electrochemical cell by reversing a flow of the electrical current at a periodic rate selected to prevent voltage across the anode and cathode from rising to a level at which the hydrogen gas is generated in the electrochemical cell; and
at least one ionic connection between the first chamber and the second chamber, the ionic connection constructed and arranged to prevent liquid electrolyte in the first chamber from mixing with liquid electrolyte in the second chamber, the first chamber and the second chamber arranged in parallel and positioned remotely from each other.

2. The electrochemical cell of claim 1, wherein the ionic connection comprises at least one of a salt bridge and an ion-permeable membrane.

3. The electrochemical cell of claim 2, wherein the ion-permeable membrane is a selectively permeable to monovalent ions.

4. The electrochemical cell of claim 2, wherein the resistance per area of the ion-permeable membrane is 1.0 Ω/mm$^2$ or less.

5. The electrochemical cell of claim 2, wherein the resistance per area of the ion-permeable membrane is 0.1 Ω/mm$^2$ or less.

6. The electrochemical cell of claim 1, wherein the liquid electrolyte in the first chamber and the liquid electrolyte in the second chamber have different compositions.

7. The electrochemical cell of claim 6, wherein the liquid electrolyte in the first chamber and the liquid electrolyte in the second chamber have different salinities.

8. The electrochemical cell of claim 1, wherein the first chamber further comprises a recirculating channel extending between the outlet of the first chamber and the inlet of the first chamber and configured to circulate electrolyte between the outlet of the first chamber and the inlet of the first chamber without mixing with electrolyte from the second chamber.

9. The electrochemical cell of claim 8, wherein the second chamber is a single-pass chamber.

10. The electrochemical cell of claim 1, wherein the second chamber further comprises a recirculating channel extending between the outlet of the second chamber and the inlet of the second chamber.

11. The electrochemical cell of claim 1, further comprising a shared electrolyte channel which splits into a first channel fluidly connected to the first chamber and a second channel fluidly connected to the second chamber.

12. The electrochemical cell of claim 1, wherein the first chamber is disposed within a first housing and the second chamber is disposed within a second housing separate from the first housing.

13. A water treatment system comprising the electrochemical cell of claim 1 in fluid communication with a source of water and a source of an oxidant, and constructed and arranged to electrochemically generate $H_2O_2$ from the water.

14. A seawater treatment system comprising the electrochemical cell of claim 1 in fluid communication with a source of seawater and constructed and arranged to electrochemically generate NaOCl from the seawater.

15. An electrochemical system comprising:
an electrochemical cell including:
a first chamber having an inlet, an outlet, and an anode disposed within the first chamber;
a second chamber having an inlet, an outlet, and a cathode disposed within the second chamber and positioned remotely from the first chamber;
a controller configured to apply an electrical current across the anode and cathode and to mitigate generation of hydrogen gas within the electrochemical cell by reversing a flow of the electrical current at a periodic rate selected to prevent voltage across the anode and cathode from rising to a level at which the hydrogen gas is generated in the electrochemical cell;
at least one ionic connection between the first chamber and the second chamber;
a first source of a saline aqueous solution having an outlet fluidly connectable to the inlet of the first chamber; and
a second source of a saline aqueous solution having an outlet fluidly connectable to the inlet of the second chamber.

16. The electrochemical system of claim 15, wherein the first source of the saline aqueous solution has a different salinity than the second source of the saline aqueous solution.

17. The electrochemical system of claim 16, wherein the first source of the saline aqueous solution comprises seawater and the second source of the saline aqueous solution comprises brine.

18. The electrochemical system of claim 16, further comprising a recirculation line extending between the outlet and the inlet of the first chamber.

19. The electrochemical system of claim 15, further comprising a source of an oxidizing agent fluidly connectable to the second source of the saline aqueous solution upstream of the electrochemical cell.

20. The electrochemical system of claim 19, further comprising:
a sensor constructed and arranged to measure at least one of a concentration of dissolved oxygen, a concentration of dissolved hydrogen, and hydrogen gas in the second chamber; and a controller configured to regulate a rate of introduction of the oxidizing agent into the second source of the saline aqueous solution responsive to at least one of the concentration of dissolved oxygen, the concentration of dissolved hydrogen, and the hydrogen gas being outside a predetermined range.

21. The electrochemical system of claim 20, wherein the controller is configured to regulate the rate of introduction of the oxidizing agent into the second source of the saline aqueous solution in an amount sufficient to prevent formation of hydrogen gas at the cathode during operation of the electrochemical cell.

22. The electrochemical system of claim 19, wherein the source of the oxidizing agent is constructed and arranged to deliver hydrogen peroxide to the second source of the saline aqueous solution from the outlet of the second chamber.

23. The electrochemical system of claim 15, wherein at least one of the first source of the saline aqueous solution and the second source of the aqueous solution comprises seawater, brackish water, or brine.

\* \* \* \* \*